US009645651B2

(12) United States Patent
Hwang et al.

(10) Patent No.: US 9,645,651 B2
(45) Date of Patent: May 9, 2017

(54) PRESENTATION OF A CONTROL INTERFACE ON A TOUCH-ENABLED DEVICE BASED ON A MOTION OR ABSENCE THEREOF

(71) Applicant: Microsoft Technology Licensing, LLC, Redmond, WA (US)

(72) Inventors: Daniel J. Hwang, Renton, WA (US); Juan (Lynn) Dai, Sammamish, WA (US); Sharath Viswanathan, Seattle, WA (US); Joseph B. Tobens, Seattle, WA (US); Jose A. Rodriguez, Seattle, WA (US); Peter G. Davis, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 321 days.

(21) Appl. No.: 14/035,888

(22) Filed: Sep. 24, 2013

(65) Prior Publication Data
US 2015/0089419 A1    Mar. 26, 2015

(51) Int. Cl.
*G06F 3/0488* (2013.01)
*G06F 3/01* (2006.01)
*G06F 3/0482* (2013.01)

(52) U.S. Cl.
CPC ............ *G06F 3/017* (2013.01); *G06F 3/0482* (2013.01); *G06F 3/04883* (2013.01); *G06F 2203/04101* (2013.01); *G06F 2203/04804* (2013.01); *G06F 2203/04806* (2013.01); *G06F 2203/04808* (2013.01)

(58) Field of Classification Search
CPC ...................................................... G06F 3/0488
USPC .......................................................... 715/765
See application file for complete search history.

(56) References Cited

U.S. PATENT DOCUMENTS 7,602,382 B2   10/2009   Hinckley et al.
7,877,707 B2    1/2011   Westerman et al.
8,219,936 B2    7/2012   Kim et al.
(Continued)

OTHER PUBLICATIONS

Jordan Crook, "Samsung Galaxy S 4 Beats the Best With 5-inch, 1080p Display, 1.9GHz Processor, Gesture Controls and a Q2 2013 Release", available at <http://techcrunch.com/2013/03/14/samsung-galaxy-s-4-beats-the-best-with-5-inch-1080p-display-1-9ghz-processor-gesture-controls-and-a-q2-2012-release/> retrieved on Mar. 14, 2013, 7 pages.
(Continued)

*Primary Examiner* — Andrea Leggett
(74) *Attorney, Agent, or Firm* — Wade IP Law LLC

(57) ABSTRACT

Techniques are described herein that are capable of causing a control interface to be presented on a touch-enabled device based on a motion or absence thereof. A motion, such as a hover gesture, can be detected and the control interface presented in response to the detection. Alternatively, absence of a motion can be detected and the control interface presented in response to the detection. A hover gesture can occur without a user physically touching a touch screen of a touch-enabled device. Instead, the user's finger or fingers can be positioned at a spaced distance above the touch screen. The touch screen can detect that the user's fingers are proximate to the touch screen, such as through capacitive sensing. Additionally, finger movement can be detected while the fingers are hovering to expand the existing options for gesture input.

20 Claims, 12 Drawing Sheets

(56) References Cited

U.S. PATENT DOCUMENTS

| | | |
|---|---|---|
| 8,255,836 B1 | 8/2012 | Gildfind |
| 8,347,221 B2 | 1/2013 | Griffin et al. |
| 8,381,135 B2 | 2/2013 | Hotelling et al. |
| 2006/0161870 A1* | 7/2006 | Hotelling .............. G06F 3/0485 715/863 |
| 2007/0124503 A1* | 5/2007 | Ramos .................... G06F 3/017 709/248 |
| 2008/0168403 A1* | 7/2008 | Westerman ......... G06F 3/04883 715/863 |
| 2009/0265670 A1* | 10/2009 | Kim .................... G06F 3/04883 715/863 |
| 2009/0303199 A1 | 12/2009 | Cho et al. |
| 2010/0277505 A1 | 11/2010 | Ludden et al. |
| 2012/0212438 A1 | 8/2012 | Vaisanen |
| 2012/0262420 A1 | 10/2012 | Sobel et al. |
| 2012/0304133 A1 | 11/2012 | Nan et al. |
| 2012/0306738 A1* | 12/2012 | Yamashita .............. G06F 3/041 345/156 |
| 2013/0050131 A1* | 2/2013 | Lee .................... G08G 1/09626 345/174 |
| 2013/0194314 A1 | 8/2013 | Arrasvuori |

OTHER PUBLICATIONS

Chen et al. "uTouch: Sensing Touch Gestures on Unmodified LCDs", Electrical Engineering, Computer Science & Engineering UbiComp Lab, DUB Group, University of Washington Seattle, WA (USA), Apr. 27-May 2, 2013, 4 pages.

"Gestures, Manipulations, and Interactions (Windows Store apps)" available at <http://msdn.microsoft.com/en-in/library/windows/apps/hh761498.aspx>, Retrieved on Apr. 24, 2013, 8 pages.

Takeoka et al. "Z-touch: An Infrastructure for 3D Gesture Interaction in the Proximity of Tabletop Surfaces",In Proceedings of ACM International Conference on Interactive Tabletops and Surfaces, Nov. 7, 2010, 4 pages.

"International Search Report & Written Opinion Issued in PCT Application No. PCT/US2014/056423", Mailed Date: Dec. 12, 2014, 9 Pages.

"Office Action Issued in Colombian Patent Application No. 16-77532", Mailed Date: May 24, 2016, 3 Pages. (w/o English Translation).

* cited by examiner

PRESENTATION OF A CONTROL INTERFACE ON A TOUCH-ENABLED DEVICE BASED ON A MOTION OR ABSENCE THEREOF

BACKGROUND

Touch screens have had enormous growth in recent years. Touch screens are now common in places such as kiosks at airports, automatic teller machines (ATMs), vending machines, computers, mobile phones, etc.

A touch screen typically provides a user with a plurality of options through icons, and the user can select those icons to launch an application, to control an application, to obtain additional information associated with the icons, etc. If the result of a selection does not provide the user with the desired result, then he/she typically selects a "back" button or "home" button or otherwise backs out of the application or information.

Moreover, controlling an application by selecting icons typically involves multiple steps. For instance, the user may select an icon to obtain access to a control panel that includes multiple icons corresponding to controls. The user may then select one or more of the icons that correspond to the controls to control the application. Once the user is finished using the control panel, the user typically selects one or more icons to cause the control panel to be removed from the touch screen. Selecting multiple icons to achieve an intended result costs the user time. Additionally, for mobile phone users, battery life may be unnecessarily wasted.

SUMMARY

Various approaches are described herein for, among other things, causing a control interface to be presented on a touch-enabled device based on a motion or absence thereof. A motion, such as a hover gesture, can be detected and the control interface presented in response to the detection. Alternatively, absence of a motion can be detected and the control interface presented in response to the detection. A hover gesture can occur without a user physically touching a touch screen of a touch-enabled device. Instead, the user's finger or fingers can be positioned at a spaced distance above the touch screen. The touch screen can detect that the user's fingers are proximate to the touch screen, such as through capacitive sensing. Additionally, finger movement can be detected while the fingers are hovering to expand the existing options for gesture input.

Example methods are described. In accordance with a first example method, finger(s) are detected in a hover position. The finger(s) are a spaced distance from a touch screen. A motion of at least one of the finger(s) is detected. The motion is a user command to present a control interface configured to control content associated with a virtual element that is displayed on the touch screen. The control interface is caused to be presented on the touch screen based on the motion.

In accordance with a second example method, finger(s) are detected in a hover position. The finger(s) are a spaced distance from a touch screen. A motion of at least one of the finger(s) is detected. The motion is a user command to increase visibility of a control interface that is at least partially visible on the touch screen. The control interface is configured to control content associated with a virtual element that is displayed on the touch screen. The visibility of the control interface on the touch screen is caused to increase based on the motion.

In accordance with a third example method, finger(s) are detected in a hover position. The finger(s) are a spaced distance from a touch screen. A user command to present a control interface is detected. The control interface is configured to control content associated with a virtual element that is displayed on the touch screen. The user command is characterized by the finger(s) remaining in the hover position for at least a specified period of time and further characterized by the finger(s) remaining motionless for at least the specified period of time. The control interface is caused to be presented on the touch screen based on detection of the user command.

Example systems are also described. A first example system includes a touch screen sensor, a gesture engine, and a rendering engine. The touch screen sensor is configured to detect finger(s) in a hover position. The finger(s) are a spaced distance from a touch screen. The gesture engine is configured to detect a motion of at least one of the finger(s). The motion is a user command to present a control interface configured to control content associated with a virtual element that is displayed on the touch screen. The rendering engine is configured to cause the control interface to be presented on the touch screen based on the motion.

A second example system includes a touch screen sensor, a gesture engine, and a rendering engine. The touch screen sensor is configured to detect finger(s) in a hover position. The finger(s) are a spaced distance from a touch screen. The gesture engine is configured to detect a motion of at least one of the finger(s). The motion is a user command to increase visibility of a control interface that is at least partially visible on the touch screen. The control interface is configured to control content associated with a virtual element that is displayed on the touch screen. The rendering engine is configured to cause the visibility of the control interface on the touch screen to increase based on the motion.

A third example system includes a touch screen sensor, a gesture engine, and a rendering engine. The touch screen sensor is configured to detect finger(s) in a hover position. The finger(s) are a spaced distance from a touch screen. The gesture engine is configured to detect a user command to present a control interface. The control interface is configured to control content associated with a virtual element that is displayed on the touch screen. The user command is characterized by the finger(s) remaining in the hover position for at least a specified period of time and further characterized by the finger(s) remaining motionless for at least the specified period of time. The rendering engine is configured to cause the control interface to be presented on the touch screen based on detection of the user command.

Computer program products are also described. A first example computer program product includes a computer-readable medium having computer program logic recorded thereon for enabling a processor-based system to causing a control interface to be presented. The computer program product includes a first program logic module, a second program logic module, and a third program logic module. The first program logic module is for enabling the processor-based system to detect finger(s) in a hover position. The finger(s) are a spaced distance from a touch screen. The second program logic module is for enabling the processor-based system to detect a motion of at least one of the finger(s). The motion is a user command to present the control interface configured to control content associated with a virtual element that is displayed on the touch screen. The third program logic module is for enabling the processor-based system to cause the control interface to be presented on the touch screen based on the motion.

A second example computer program product includes a computer-readable medium having computer program logic recorded thereon for enabling a processor-based system to cause visibility of a control interface to increase. The computer program product includes a first program logic module, a second program logic module, and a third program logic module. The first program logic module is for enabling the processor-based system to detect finger(s) in a hover position. The finger(s) are a spaced distance from a touch screen. The second program logic module is for enabling the processor-based system to detect a motion of at least one of the finger(s). The motion is a user command to increase the visibility of the control interface, which is at least partially visible on the touch screen. The control interface is configured to control content associated with a virtual element that is displayed on the touch screen. The third program logic module is for enabling the processor-based system to cause the visibility of the control interface on the touch screen to increase based on the motion.

A third example computer program product includes a computer-readable medium having computer program logic recorded thereon for enabling a processor-based system to causing a control interface to be presented. The computer program product includes a first program logic module, a second program logic module, and a third program logic module. The first program logic module is for enabling the processor-based system to detect finger(s) in a hover position. The finger(s) are a spaced distance from a touch screen. The second program logic module is for enabling the processor-based system to detect a user command to present the control interface. The control interface is configured to control content associated with a virtual element that is displayed on the touch screen. The user command is characterized by the finger(s) remaining in the hover position for at least a specified period of time and further characterized by the finger(s) remaining motionless for at least the specified period of time. The third program logic module is for enabling the processor-based system to cause the control interface to be presented on the touch screen based on detection of the user command.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Moreover, it is noted that the invention is not limited to the specific embodiments described in the Detailed Description and/or other sections of this document. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate embodiments of the present invention and, together with the description, further serve to explain the principles involved and to enable a person skilled in the relevant art(s) to make and use the disclosed technologies.

Figure 1:
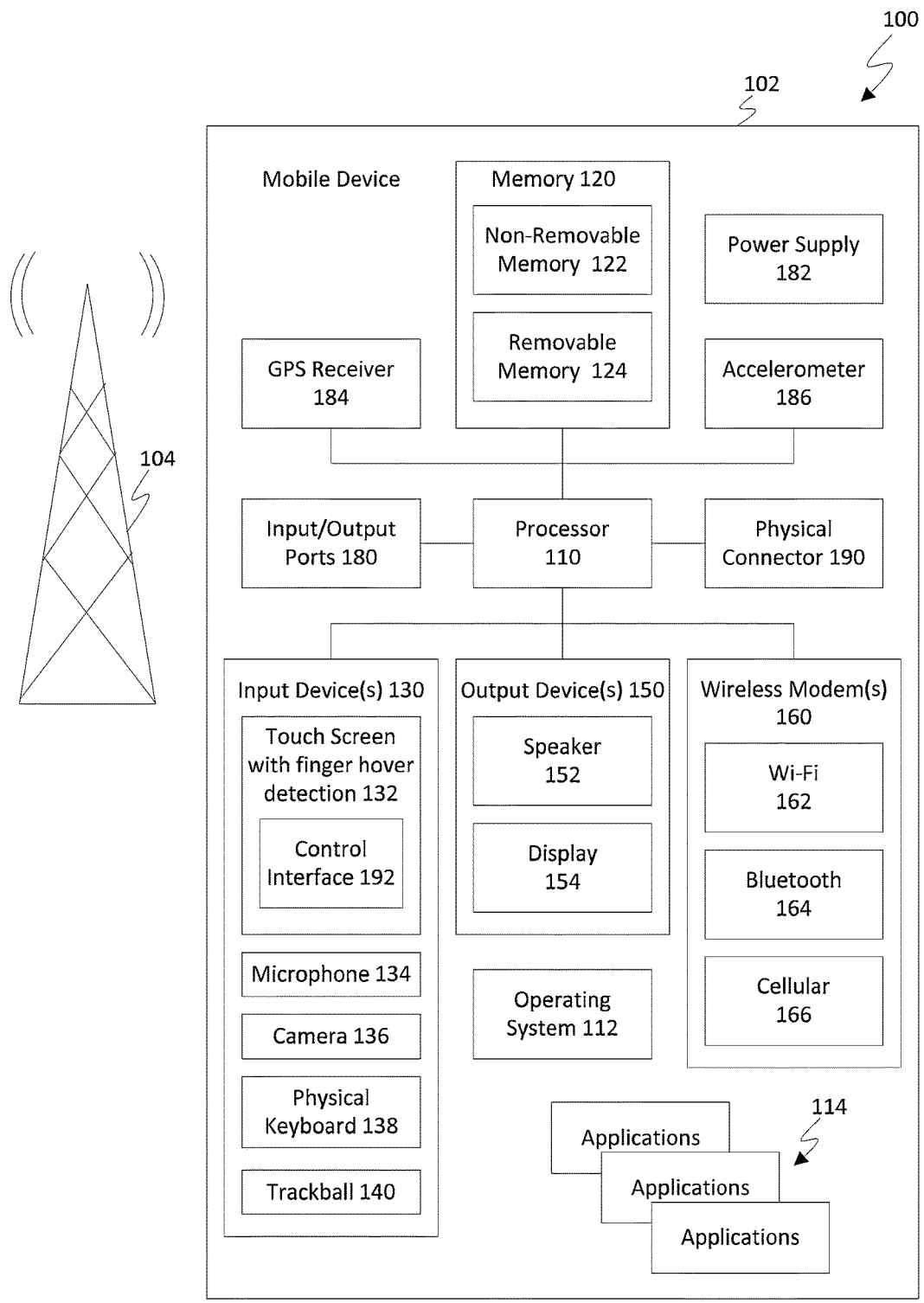
FIG. 1 is a system diagram of an exemplary mobile device with a touch screen for sensing a finger hover, motion and/or absence thereof, gesture, etc.

The features and advantages of the disclosed technologies will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The following detailed description refers to the accompanying drawings that illustrate exemplary embodiments of the present invention. However, the scope of the present invention is not limited to these embodiments, but is instead defined by the appended claims. Thus, embodiments beyond those shown in the accompanying drawings, such as modified versions of the illustrated embodiments, may nevertheless be encompassed by the present invention.

References in the specification to "one embodiment," "an embodiment," "an example embodiment," or the like, indicate that the embodiment described may include a particular feature, structure, or characteristic, but every embodiment may not necessarily include the particular feature, structure, or characteristic. Moreover, such phrases are not necessarily referring to the same embodiment. Furthermore, when a particular feature, structure, or characteristic is described in connection with an embodiment, it is submitted that it is within the knowledge of one skilled in the relevant art(s) to implement such feature, structure, or characteristic in connection with other embodiments whether or not explicitly described.

II. Example Embodiments

Example embodiments described herein are capable of receiving user input on a touch screen or other touch responsive surfaces. Examples of such touch responsive surfaces include materials which are responsive to resistance, capacitance, or light to detect touch or proximity gestures. A motion (e.g., a hover gesture) or an absence of motion can be detected and an action performed in response to the detection. A hover gesture can occur without a user physically touching a touch screen. Instead, the user's finger or fingers can be positioned at a spaced distance above the touch screen. The touch screen can detect that the user's fingers are proximate to the touch screen, such as through capacitive sensing. Additionally, finger movement can be detected while the fingers are hovering to expand the existing options for gesture input.

Example techniques described herein have a variety of benefits as compared to conventional techniques for receiving user input on a touch screen. For example, the techniques may be capable of causing a control interface to be presented on a touch screen based on an occurrence of a motion or an absence of motion. The motion or absence thereof may be performed by finger(s) of a user. For instance, the motion or absence thereof may be performed while the finger(s) are a spaced distance from the touch screen. Accordingly, the control interface may be invoked without the finger(s) touching the touch screen. The example techniques may reduce an amount of time and/or resources (e.g., processing resources) that are consumed in order to cause the control interface to be presented. For instance, the techniques may eliminate a need to select icons on the touch screen in order to cause the control interface to be presented. A motion for causing a control interface to be presented may include a hover gesture. Such hover gesture need not necessarily be as precise as some other types of gestures (e.g., touch gestures) in order for accurate detection thereof to occur.

Embodiments described herein focus on a mobile device, such as a mobile phone. However, the described embodiments can be applied to any device with a touch screen or a touch surface, including laptop computers, tablets, desktop computers, televisions, wearable devices, etc.

Embodiments are described with respect to hover touch gestures (a.k.a. hover gestures) for illustrative purposes and are not intended to be limiting. It will be recognized that the embodiments described herein may be implemented using any suitable type of motion. Such motion need not necessarily include a hover touch gesture.

Hover Touch is built into the touch framework to detect a finger above-screen as well as to track finger movement. For example, a gesture engine can be used to detect motion of finger(s) or absence of such motion. A motion may include a hover touch gesture, though the scope of the example embodiments is not limited in this respect. It will be recognized that allowing for hover recognition significantly expands the library of available gestures to implement on a touch screen device.

The gesture engine can be used for the recognition of hover touch gestures, including as examples: (1) finger hover pan—float a finger above the screen and pan the finger in any direction; (2) finger hover tickle/flick—float a finger above the screen and quickly flick the finger one or more times as like a tickling motion with the finger; (3) finger hover circle—float a finger or thumb above the screen and draw a circle or counter-circle in the air; (4) finger hover hold—float a finger above the screen and keep the finger stationary; (5) palm swipe—float the edge of the hand or the palm of the hand and swipe across the screen; (6) air pinch/lift/drop—use the thumb and pointing finger to do a pinch gesture above the screen, drag, then a release motion; (7) hand wave gesture—float hand above the screen and move the hand back and forth in a hand-waving motion.

The hover touch gesture relates to a user-input command wherein the user's hand (e.g., one or more fingers, palm, etc.) is a spaced distance from the touch screen meaning that the user is not in contact with the touch screen. Moreover, the user's hand should be within a close range to the touch screen, such as between 0.1 to 0.25 inches, or between 0.25 inches and 0.5 inches, or between 0.5 inches and 0.75 inches or between 0.75 inches and 1 inch, or between 1 inch and 1.5 inches, etc. Any desired distance can be used, but in many embodiments generally such a distance can be less than 2 inches.

A variety of ranges can be used. The sensing of a user's hand can be based on capacitive sensing, but other techniques can be used, such as an ultrasonic distance sensor or camera-based sensing (images taken of user's hand to obtain distance and movement).

Once a motion is detected (e.g., once a hover touch gesture is recognized), a control interface may be presented (e.g., automatically presented) on the touch screen, as further described below.

FIG. 1 is a system diagram depicting an exemplary mobile device 100 including a variety of optional hardware and software components, shown generally at 102. Any components 102 in the mobile device can communicate with any other component, although not all connections are shown, for ease of illustration. The mobile device can be any of a variety of computing devices (e.g., cell phone, smartphone, handheld computer, Personal Digital Assistant (PDA), etc.) and can allow wireless two-way communications with one or more mobile communications networks 104, such as a cellular or satellite network, or with a local area or wide area network.

The illustrated mobile device 100 can include a controller or processor 110 (e.g., signal processor, microprocessor, ASIC, or other control and processing logic circuitry) for performing such tasks as signal coding, data processing, input/output processing, power control, and/or other functions. An operating system 112 can control the allocation and usage of the components 102 and support for one or more application programs 114 (a.k.a. applications). The application programs 114 can include common mobile computing applications (e.g., email applications, calendars, contact managers, web browsers, messaging applications) and any other computing applications (e.g., word processing applications, mapping applications, media player applications).

The illustrated mobile device 100 can include memory 120. Memory 120 can include non-removable memory 122 and/or removable memory 124. The non-removable memory 122 can include RAM, ROM, flash memory, a hard disk, or other well-known memory storage technologies. The removable memory 124 can include flash memory or a Subscriber Identity Module (SIM) card, which is well known in GSM communication systems, or other well-known memory storage technologies, such as "smart cards." The memory 120 can be used for storing data and/or code for running the operating system 112 and the applications 114. Example data can include web pages, text, images, sound files, video data, or other data sets to be sent to and/or received from one or more network servers or other devices via one or more wired or wireless networks. The memory 120 can be used to store a subscriber identifier, such as an International Mobile Subscriber Identity (IMSI), and an equipment identifier, such as an International Mobile Equipment Identifier (IMEI). Such identifiers can be transmitted to a network server to identify users and equipment.

The mobile device 100 can support one or more input devices 130, such as a touch screen 132, microphone 134, camera 136, physical keyboard 138 and/or trackball 140 and one or more output devices 150, such as a speaker 152 and a display 154. Touch screens, such as touch screen 132, can detect input in different ways. For example, capacitive touch screens detect touch input when an object (e.g., a fingertip) distorts or interrupts an electrical current running across the surface. As another example, touch screens can use optical sensors to detect touch input when beams from the optical sensors are interrupted. Physical contact with the surface of the screen is not necessary for input to be detected by some touch screens. For example, the touch screen 132 can support a finger hover detection using capacitive sensing, as is well understood in the art. Other detection techniques can be used, as already described above, including camera-based detection and ultrasonic-based detection. To implement a finger hover, a user's finger is typically within a predetermined spaced distance above the touch screen, such as between 0.1 to 0.25 inches, or between 0.25 inches and 0.05 inches, or between 0.5 inches and 0.75 inches or between 0.75 inches and 1 inch, or between 1 inch and 1.5 inches, etc.

The touch screen 132 is shown to include a control interface 192 for illustrative purposes. The control interface 192 is configured to control content associated with a virtual element that is displayed on the touch screen 132. In an example embodiment, the control interface 192 is configured to control content that is provided by one or more of the applications 114. For instance, when a user of the mobile device 102 utilizes an application, the control interface 192 may be presented to the user on the touch screen 132 to enable the user to access controls that control such content. Presentation of the control interface 192 may be based on (e.g., triggered by) detection of a motion within a designated distance from the touch screen 132 or absence of such motion. Example embodiments for causing a control interface (e.g., control interface 192) to be presented on a touch screen (e.g., touch screen 132) based on a motion or absence thereof are described in greater detail below.

Other possible output devices (not shown) can include piezoelectric or other haptic output devices. Some devices can serve more than one input/output function. For example, touch screen 132 and display 154 can be combined in a single input/output device. The input devices 130 can include a Natural User Interface (NUI). An NUI is any interface technology that enables a user to interact with a device in a "natural" manner, free from artificial constraints imposed by input devices such as mice, keyboards, remote controls, and the like. Examples of NUI methods include those relying on speech recognition, touch and stylus recognition, gesture recognition both on screen and adjacent to the screen, air gestures, head and eye tracking, voice and speech, vision, touch, gestures, and machine intelligence. Other examples of a NUI include motion gesture detection using accelerometers/gyroscopes, facial recognition, 3D displays, head, eye, and gaze tracking, immersive augmented reality and virtual reality systems, all of which provide a more natural interface, as well as technologies for sensing brain activity using electric field sensing electrodes (EEG and related methods). Thus, in one specific example, the operating system 112 or applications 114 can comprise speech-recognition software as part of a voice control interface that allows a user to operate the device 100 via voice commands. Further, the device 100 can comprise input devices and software that allows for user interaction via a user's spatial gestures, such as detecting and interpreting gestures to provide input to a gaming application.

Wireless modem(s) 160 can be coupled to antenna(s) (not shown) and can support two-way communications between the processor 110 and external devices, as is well understood in the art. The modem(s) 160 are shown generically and can include a cellular modem 166 for communicating with the mobile communication network 104 and/or other radio-based modems (e.g., Bluetooth 164 and/or Wi-Fi 162). At least one of the wireless modem(s) 160 is typically configured for communication with one or more cellular networks, such as a GSM network for data and voice communications within a single cellular network, between cellular networks, or between the mobile device and a public switched telephone network (PSTN).

The mobile device can further include at least one input/output port 180, a power supply 182, a satellite navigation system receiver 184, such as a Global Positioning System (GPS) receiver, an accelerometer 186, and/or a physical connector 190, which can be a USB port, IEEE 1394 (FireWire) port, and/or RS-232 port. The illustrated components 102 are not required or all-inclusive, as any components can be deleted and other components can be added as would be recognized by one skilled in the art.

Figure 2:
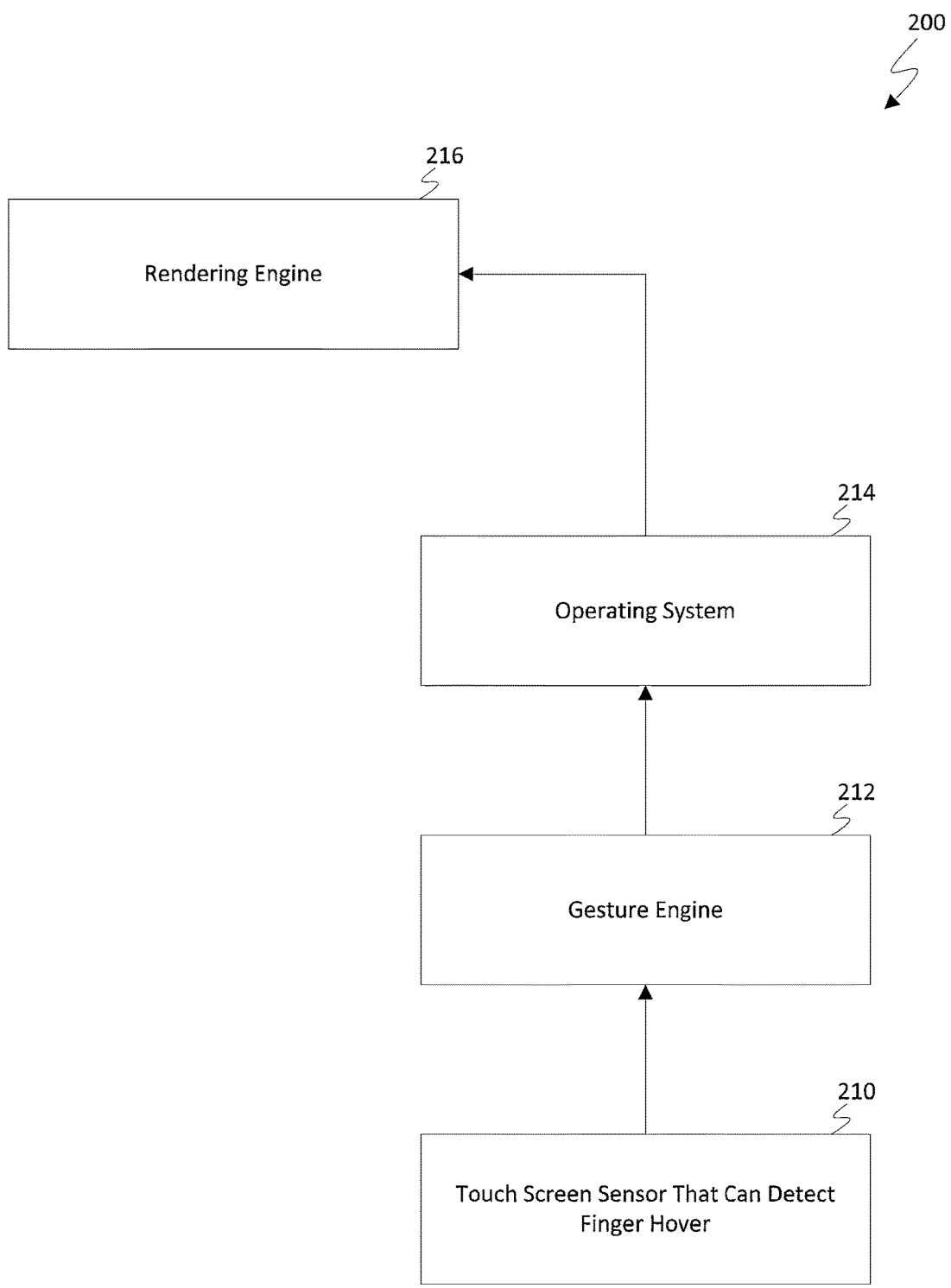
FIG. 2 is an illustration of exemplary system components that can be used to receive finger-based hover input.

FIG. 2 is a system diagram showing further details of components that can be used to implement a hover user input. A touch screen sensor 210 can detect a finger hover at a spaced distance (i.e., a non-zero distance) above a touch screen (e.g., touch screen 132). Some examples of such technology are available from Cypress Semiconductor Corp.®, although other systems that provide similar detection functionality are known in the art.

A gesture engine 212 can receive input from the touch screen sensor to interpret user input including finger(s) in a hover position (a position at a distance above the touch screen), motion of at least one of the finger(s) or absence of such motion, etc. The motion may include a hover gesture (a user input command to perform an action). A hover gesture can include a user finger remaining in a fixed position for a predetermined period of time or some predetermined finger movement. Some predetermined finger movements can include a tickle movement, wherein the user moves his/her fingertip back and forth in a rapid motion to mimic tickling, or a circle movement, or a check movement (like a user is checking a box), etc. Specific gestures include, but are not limited to (1) finger hover pan—float a finger above the screen and pan the finger in any direction; (2) finger hover tickle/flick—float a finger above the screen and quickly flick the finger once or multiple times as like a tickling motion with the finger; (3) finger hover circle—float a finger or thumb above the screen and draw a circle or counter-circle in the air; (4) finger hover hold—float a finger above the screen and keep the finger stationary; (5) palm swipe—float the edge of the hand or the palm of the hand and swipe across the screen; (6) air pinch/lift/drop—use the thumb and pointing finger to do a pinch gesture above the screen, drag, then a release motion; (7) hand wave gesture—float hand above the screen and move the hand back and forth in a hand-waving motion. With each of these gestures, the user's fingers do not touch the screen.

Once the gesture engine 212 interprets the user input, the gesture engine 212 can alert an operating system 214 of the motion (e.g., gesture), absence of motion, etc. In response, the operating system 214 can cause a control interface (e.g., control interface 192) to be presented on the touch screen using a rendering engine 216. It can also be said that the rendering engine causes the control interface to be presented on the touch screen.

Figure 3:
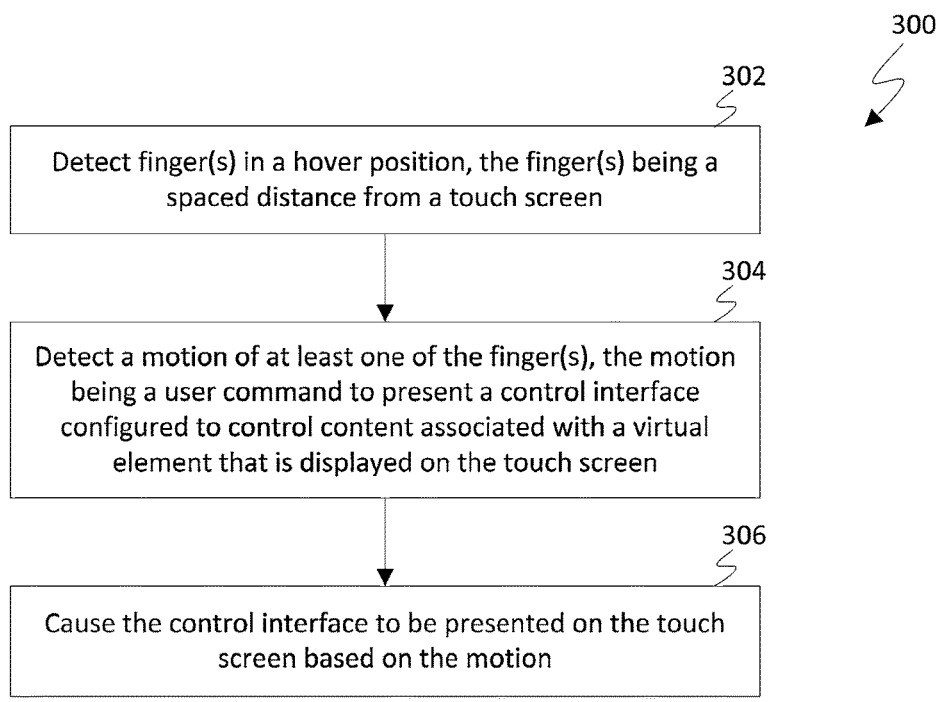
FIG. 3 depicts a flowchart of an example method for causing a control interface to be presented in accordance with an embodiment.

FIG. 3 depicts a flowchart 300 of an example method for causing a control interface to be presented in accordance with an embodiment. Flowchart 300 may be performed by a mobile device, such as mobile device 100 shown in FIG. 1. It will be recognized that such a mobile device may include any one or more of the system components shown in FIG. 2. For instance, the mobile device may include touch screen sensor 210, gesture engine 212, operating system 214, and/or rendering engine 216. For illustrative purposes, flowchart 300 is described with respect to the system components shown in FIG. 2. Further structural and operational embodiments will be apparent to persons skilled in the relevant art(s) based on the discussion regarding flowchart 300.

As shown in FIG. 3, the method of flowchart 300 begins at step 302. In step 302, finger(s) are detected in a hover position. For instance, a presence of the finger(s) may be detected in the hover position. The finger(s) are a spaced distance from a touch screen. A hover position occurs when one or more fingers are detected above a touch screen by a spaced distance (which can be any distance whether it be predetermined or based on reception of a signal), but without the one or more fingers physically touching the touch screen. Detection means that a touch sensor (e.g., touch screen sensor 210) recognizes that one or more fingers are near the touch screen. In an example implementation, touch screen sensor 210 detects the finger(s) in the hover position. In accordance with this implementation, the finger(s) are a spaced distance from touch screen 132. For instance, the finger(s) may be a spaced distance from touch screen sensor 210 on touch screen 132.

In an example embodiment, detecting the finger(s) in the hover position at step 302 causes a hover mode to be entered. In accordance with this embodiment, once the hover mode is entered, then motion(s) (e.g., hover gesture(s)) can be detected as described in further detail below.

At step 304, a motion of at least one of the finger(s) is detected. The motion is a user command to present a control interface configured to control content associated with a virtual element that is displayed on the touch screen. The motion occurs without the at least one of the finger(s) touching the touch screen. In an example implementation, gesture engine 212 detects the motion of at least one of the finger(s).

The motion may be detected at step 304 over an area of the touch screen in which the virtual element is displayed based on the virtual element being displayed in that area. Alternatively, the motion may be detected at step 304 over an area of the touch screen without regard to where on the touch screen the virtual element is displayed. Examples of a virtual element include but are not limited to a window (e.g., a window in which the content is displayed or is to be displayed); an icon; a virtual button; a photograph; a drawing; a textual document (e.g., an email); and a representation of an item, such as a map (or point of interest thereon), a song, a movie, or a computer program (e.g., a graphics editing program, a word processing program, an email program, a map program, a media player, etc.). The content associated with the virtual element may be content that is displayed in the virtual element, though the scope of the example embodiments is not limited in this respect. Examples of content include but are not limited to media content (e.g., audio, video, photograph(s), or a combination thereof), audio/visual content (e.g., video with sound), audio content, visual content, etc. Visual content may include non-textual content (e.g., map, photograph, video without sound) and/or textual content. Example implementations that utilize some of the example virtual elements and content mentioned above are described in further detail below.

In an example embodiment, step 304 includes detecting that the motion occurs for at least a specified period of time. For example, the specified period of time may be a fixed (e.g., predetermined) period of time (e.g., 0.5 seconds, 0.8 seconds, 1.0 seconds, 1.2 seconds, 1.5 seconds). In another example, the specified period may be a variable period of time that is based on one or more factors. Examples of such a factor include but are not limited to a preference (e.g., a preferred period of time) of the user, historical information regarding the user, an average, maximum, or minimum time (e.g., that the user has taken historically to complete the motion (e.g., to make a specified hover gesture), etc.

In another example embodiment, the motion detected at step 304 includes a hover gesture. In an aspect of this embodiment, step 304 includes detecting a finger hover flick performed by the at least one of the finger(s). In another aspect, step 304 includes detecting a high-velocity flick performed by the at least one of the finger(s). In accordance with this aspect, the high-velocity flick is defined by the at least one of the finger(s) traveling at a velocity that is greater than or equal to a threshold velocity. In further accordance with this aspect, detecting the finger hover flick may include measuring the velocity at which the at least one of the finger(s) travels, comparing the velocity to the threshold velocity, and determining that the velocity is greater than or equal to the threshold velocity. In yet another aspect, step 304 includes detecting a finger hover pan performed by the at least one of the finger(s). For instance, step 304 may include detecting the finger hover pan based on the at least one of the finger(s) moving in a specified (e.g., predetermined) direction with respect to the touch screen. In still another aspect, step 304 includes detecting a finger hover circle performed by the at least one of the finger(s).

In another aspect, the at least one of the finger(s) includes a plurality of fingers (i.e., multiple fingers). For example, step 304 may include detecting that the plurality of fingers are moved together (e.g., pinched together). In another example, step 304 may include detecting that the plurality of fingers are moved apart.

The example hover gestures described above with regard to step 304 are provided for illustrative purposes and are not intended to be limiting. It will be recognized that the motion detected at step 304 may include any suitable hover gesture that involves motion.

At step 306, the control interface is caused to be presented on the touch screen based on the motion. In an example implementation, operating system 214 and/or rendering engine 216 cause the control interface to be presented on touch screen 132 based on the motion.

Causing the control interface to be presented at step 306 may be performed in any of a variety of ways. In a first example embodiment, step 306 includes transitioning from a first state in which the control interface is not shown on the touch screen to a second state in which the control interface is shown on the touch screen. In an aspect of this embodiment, the transitioning is smooth. In accordance with this aspect, the transitioning may appear to a user as being continuous (e.g., no breaks or pauses in the transitioning from the first state to the second state). Accordingly, the control interface may fade into view on the touch screen. In another aspect, the transitioning is periodic and includes one or more discrete intermediate states between the first state and the second state. In accordance with this aspect, each successive intermediate state is characterized by an incrementally greater visibility of the control interface. In further accordance with this aspect, the second state is characterized by a visibility of the control interface that is greater than a visibility of the control interface that is characterized by each the one or more discrete intermediate states. In yet another aspect, the transitioning has a relatively short duration (e.g., a duration of 1.0 seconds or less, a duration of 0.8 seconds or less, 0.6 seconds or less, 0.4 seconds or less, etc.). In still another aspect, the transitioning has a relatively long duration (e.g., a duration of 1.5 seconds or more, a duration of 2.0 seconds or more, a duration of 2.5 seconds or more, a duration of 3.0 seconds or more, etc.).

In a second example embodiment, step 306 includes causing the control interface to change from a first state in which a portion of the control interface is shown on the touch screen to a second state in which an extent of the control interface that is greater than the portion (e.g., an entirety of the control interface) is shown on the touch screen. The portion of the control interfaced is less than all of the control interface. For instance, a proportion of the control interface that is displayed on the touch screen may be increased from a first proportion (e.g., 0.01, 2.2%, 1/20, 10%, etc.) that is greater than zero to a second proportion (e.g., 9/10, 0.963, 100%) that is greater than the first proportion.

In a third example embodiment, step 306 includes causing the control interface to change from a first state in which the control interface is partially transparent to a second state in which the control interface is opaque. For example, an extent opacity of the control interface may be increased from a first extent of opacity (e.g., 10%) that is great than zero to a second extent of opacity of 100%. In another example, an extent of transparency of the control interface may be reduced from a first extent of transparency (e.g., 90%) that is less than one-hundred percent to a second extent of transparency of 0%.

In a fourth example embodiment, step 306 includes causing the control interface to change from a first state to a second state. In the first state, the control interface is partially transparent to provide a first extent of transparency. In the second state, the control interface is partially transparent to provide a second extent of transparency that is less than the first extent. Each of the first extent of transparency and the second extend of transparency is greater than 0% and less than 100%.

It will be recognized that opacity and transparency are inversely related. For instance, if an extent of transparency is 0%, the corresponding extent of opacity is 100%. If an extent of transparency is 100%, the corresponding extent of opacity is 0%. In accordance with the fourth example embodiment described above, an extent of opacity of the control interface may be increased from a first extent of opacity (e.g., 5%) that is great than zero to a second extent of opacity (e.g., 99%) that is greater than the first opacity and that is less than 100%. In accordance with this example, the first extent of opacity corresponds to the first extent of transparency, and the second extent of opacity corresponds to the second extent of transparency. Accordingly, increasing the extent of opacity from 5% to 99% is equivalent to decreasing the extent of transparency from 95% to 1%. It will be recognized that the example opacity and transparency values mentioned herein are provided for illustrative purposes and are not intended to be limiting. An extent of transparency or opacity may be any suitable value.

The example ways described above for causing the control interface to be presented at step 306 are provided for illustrative purposes and are not intended to be limiting. Any suitable technique may be employed at step 306 for causing the control interface to be presented. For instance, a resolution of the control interface on the touch screen may be increased; a contrast of the control interface on the touch screen may be increased, etc.

In some example embodiments, one or more steps 302, 304, and/or 306 of flowchart 300 may not be performed. Moreover, steps in addition to or in lieu of steps 302, 304, and/or 306 may be performed. For instance, in an example embodiment, the method of flowchart 300 includes detecting removal of the finger(s) from the hover position. In accordance with this embodiment, presentation of the control interface on the touch screen is caused to be discontinued based on the removal of the finger(s) from the hover position. For instance, the control interface may slide to an edge of the touch screen or off the touch screen, become less opaque (e.g., fade away), etc.

Selected example implementations will now be described to show possible uses for the method of flowchart 300. In a first example implementation, the virtual element is a map. In accordance with this implementation, a control interface having control(s) that enable a user to zoom in and/or zoom out with respect to a location on the map is caused to be presented on the touch screen at step 306 based on the motion of the at least one of the finger(s), which is detected at step 304. For instance, the control interface may include a zoom slider control that enables the user to slide a virtual switch up (or right) to increase magnification with respect to the location and/or to slide the virtual switch down (or left) to decrease magnification with respect to the location. The example directions mentioned above are provided for illustrative purposes and are not intended to be limiting. The zoom slider control may be configured such that the virtual switch may be slid along any suitable axis in any suitable direction to increase or decrease the magnification.

In a second example implementation, the virtual element is a representation of media content (e.g., a song or a video) or a representation of a media player, which is capable of playing such content. In accordance with this implementation, a control interface having control(s) that enable a user to control the media content is caused to be presented on the touch screen at step 306. For example, the control interface may include a shuttle control. The shuttle control may enable the user to move the media content frame by frame, control (e.g., set) a rate at which the media content is to be fast forwarded and/or rewound, etc. In another example, the control interface may include a drag slider control that enables the user to drag a switch along an axis to fast forward and/or rewind to a desired point or frame in the media content. For instance, dragging the switch to the right may fast forward the media content from a point or frame of the media content that is currently playing. Dragging the switch to the left may rewind the media content from a point or frame of the media content that is currently playing. It will be recognized that the drag slider control may be configured such that the switch may be slid along any suitable axis in any suitable direction to fast forward or rewind the media content.

In a third example implementation, the virtual element is a user interface. In accordance with this implementation, an item from the chrome (e.g., an application bar or an application tray) of the user interface that enables a user to add, remove, and/or change content that is displayed in the user interface is caused to be presented on the touch screen at step 306.

In a fourth example implementation, the virtual element is a message (e.g., an email, a short message service (SMS), an instant message (IM), etc.), a list of such messages, or a representation of a messaging application, which manages transfer of such messages. In one aspect of this implementation, a control interface having control(s) that enable a user to perform operations (e.g., forward, reply, delete) with respect to a message (e.g., in a list of messages) is caused to be presented on the touch screen at step 306 based on the motion of the at least one of the finger(s), which is detected at step 304.

In another aspect of this implementation, a soft input panel (SIP) (e.g., a virtual keyboard) is caused to be presented on the touch screen at step 306 based on the motion. For instance, a history associated with the message may be displayed on the touch screen. When the motion is detected at step 304, the SIP may be presented on the touch screen as a result of step 306 so that the user may type text into the message. When the user moves his/her fingers away from the SIP (e.g., for a designated period of time), presentation of the SIP may be discontinued. For instance, the SIP may disappear from the touch screen, move to an edge of the screen, become less opaque, etc., which may enable the user to view the history. When the user moves his/her fingers back to a vicinity in which the SIP was presented, the SIP may be presented on the touch screen again, and so on.

In a fifth example implementation, the virtual element is a representation of an Internet browser. In accordance with this implementation, a control interface having control(s) that enable a user to control content that is displayed in the browser is caused to be presented on the touch screen at step 306. For example, the control interface may include control(s) for navigating between web pages (e.g., from one web page to another). In another example, if the content is media content, the control interface may include a shuttle control, a drag slider control, etc. for controlling the media content.

In a sixth example implementation, the virtual element is a virtual viewport of a camera or a representation of an image captured by the camera. In accordance with this implementation, a control interface having control(s) that enable a user to control content in the representation of the image and/or other image(s) associated therewith is caused to be presented on the touch screen at step 306. For instance, the control interface may include control(s) that enable the user to zoom in and/or zoom out with respect to object(s) in image(s), turn on and/or off a flash of the camera, turn on and/or off a video mode of the camera, select a lens type and/or one or more filters to be used with respect to image(s), etc.

FIGS. 4-17 are block diagrams showing various exemplary states of a touch-enabled device, such as mobile device 102 shown in FIG. 1, in accordance with embodiments. FIGS. 4-11 show various states that may occur prior to detecting a motion as described above with respect to step 304 of flowchart 300. FIGS. 12-17 show various states that may occur as a result of causing the control interface to be presented as described above with respect to step 306 of flowchart 300.

Figure 4:
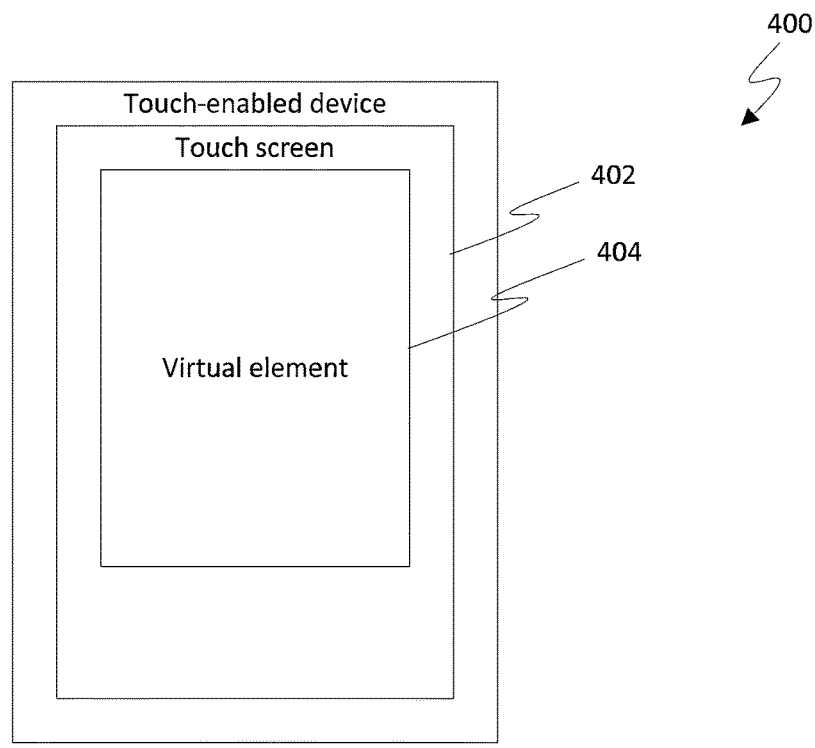
FIGS. 4-17 are block diagrams showing various exemplary states of a touch-enabled device (e.g., a mobile device shown in FIG. 1) in accordance with embodiments.

FIG. 4 depicts a state of a touch-enabled device 400 in which a touch screen 402 of the touch-enabled device 400 displays a virtual element 404. A control interface configured to control content associated with the virtual element 404 is not shown (e.g., not displayed) on the touch screen 402.

Figure 5:
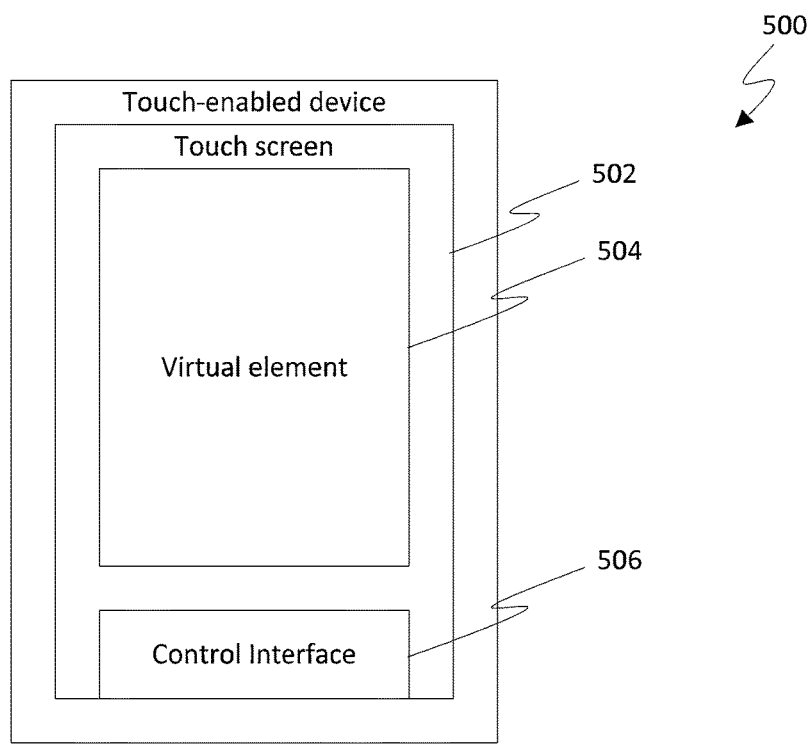

FIG. 5 depicts a state of a touch-enabled device 500 in which a touch screen 502 of the touch-enabled device 500 displays a virtual element 504. A control interface 506, which may be configured to control content associated with the virtual element 504, is partially shown on the touch screen 502. A portion of the control interface 506 is shown to be clipped by the bottom of the touch screen 502 for illustrative purposes and is not intended to be limiting. It will be recognized that portion(s) of the control interface 506 may be clipped along any one or more sides of the touch screen 502 or may be hidden behind one or more virtual element(s) on the touch screen 502. The virtual element 504 and the control interface 506 are non-overlapping (i.e., do not overlap) in FIG. 5, though the scope of the example embodiments is not limited in this respect (as will be seen in FIG. 6).

Figure 6:
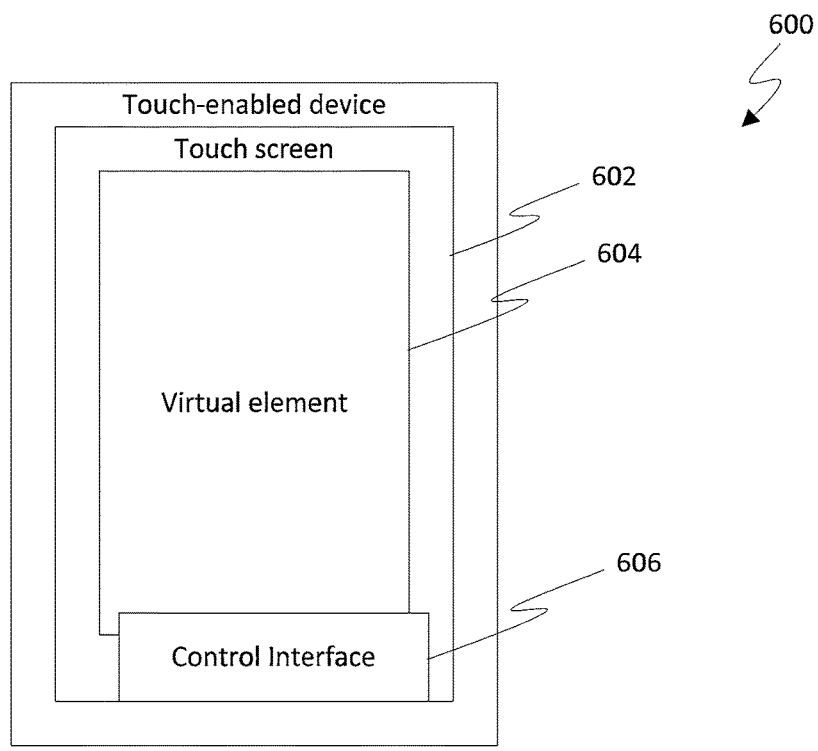

FIG. 6 depicts a state of a touch-enabled device 600 in which a touch screen 602 of the touch-enabled device 600 displays a virtual element 604. A control interface 606 is partially shown on the touch screen 602. The state depicted in FIG. 6 is similar to the state depicted in FIG. 5, except that the virtual element 604 and the control interface 606 in FIG. 6 partially overlap. As shown in FIG. 6, less than all of the control interface 606 overlaps with the virtual element 604.

Figure 7:
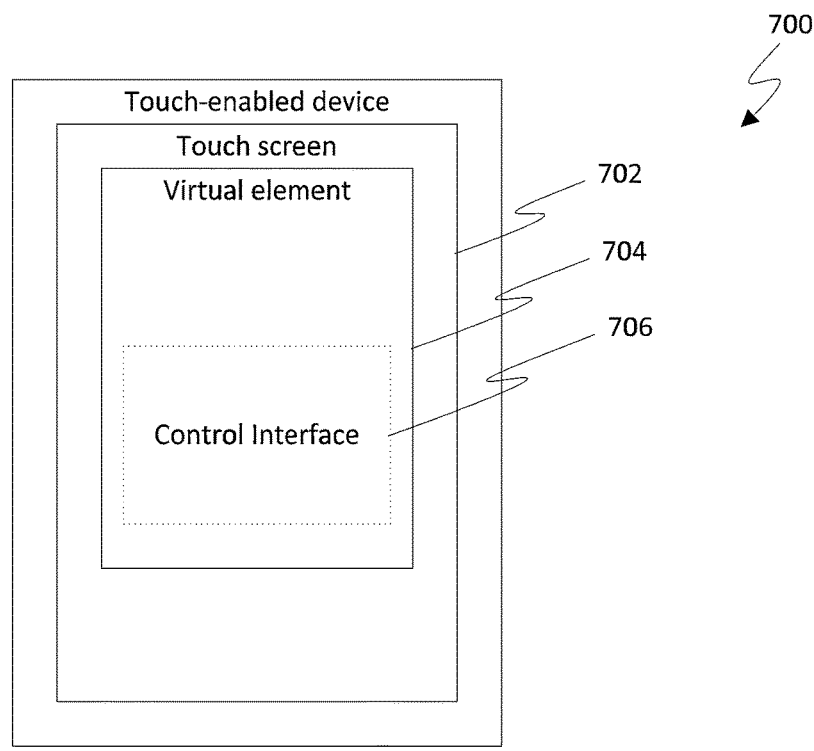

FIG. 7 depicts a state of a touch-enabled device 700 in which a touch screen 702 of the touch-enabled device 700 displays a virtual element 704. An entirety of a control interface 706 is shown on the touch screen 702. The control interface 706 is shown in FIG. 7 to be partially transparent, as indicated by the dashed outer boundary thereof. The control interface 706 fully overlaps with the virtual element 704, such that the outer boundary of the control interface 706 is included within the outer boundary of the virtual element 704.

Figure 8:
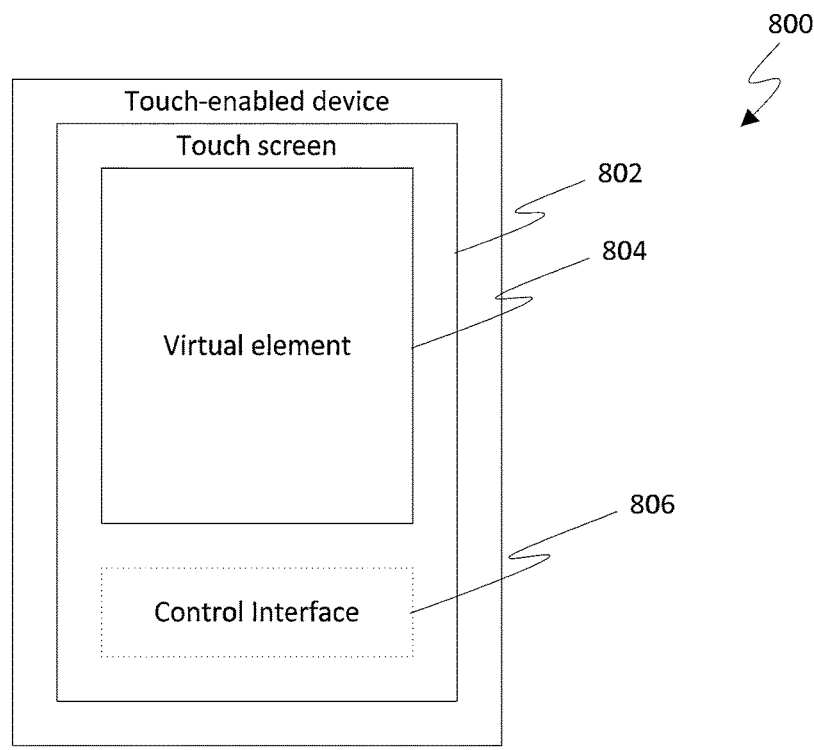

FIG. 8 depicts a state of a touch-enabled device 800 in which a touch screen 802 of the touch-enabled device 800 displays a virtual element 804. An entirety of a control interface 806 is shown on the touch screen 802. The control interface 806 is shown in FIG. 8 to be partially transparent, as indicated by the dashed outer boundary thereof. The state depicted in FIG. 8 is similar to the state depicted in FIG. 7, except that the virtual element 804 and the control interface 806 in FIG. 6 do not overlap.

Figure 9:
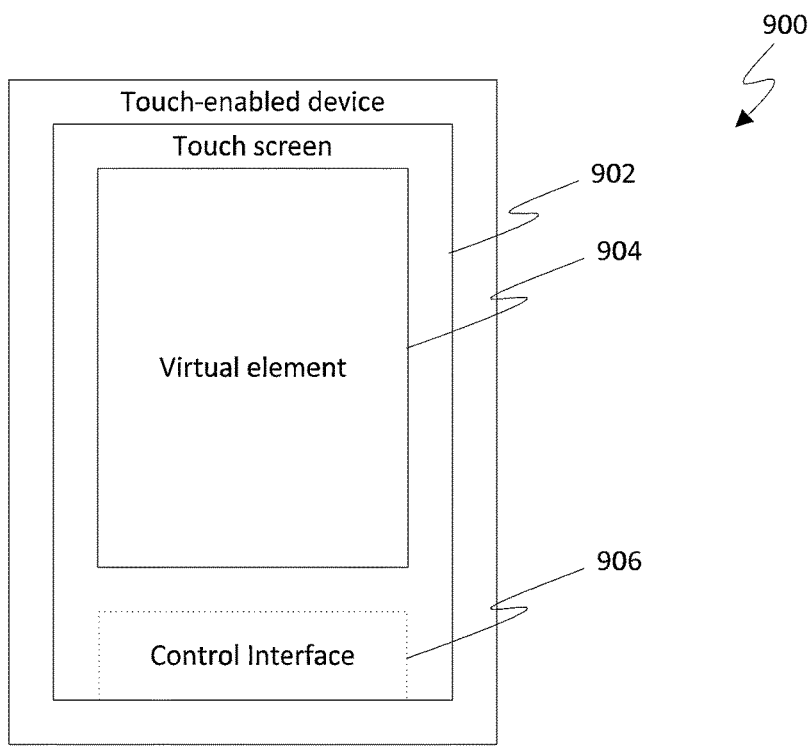

FIG. 9 depicts a state of a touch-enabled device 900 in which a touch screen 902 of the touch-enabled device 900 displays a virtual element 904. A control interface 906 is partially shown on the touch screen 902. The control interface 906 is shown in FIG. 9 to be partially transparent, as indicated by the dashed outer boundary thereof. The state depicted in FIG. 9 is similar to the state depicted in FIG. 8, except that the control interface 906 in FIG. 9 is partially shown on the touch screen 902. A portion of the control interface 906 is shown to be clipped by the bottom of the touch screen 902 for illustrative purposes and is not intended to be limiting.

Figure 10:
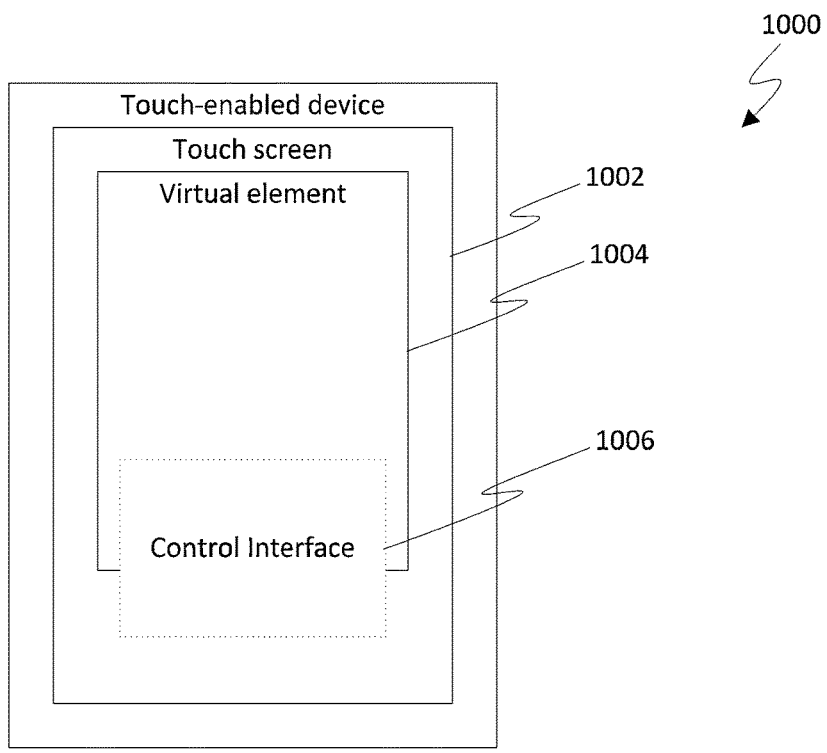

FIG. 10 depicts a state of a touch-enabled device 1000 in which a touch screen 1002 of the touch-enabled device 1000 displays a virtual element 1004. An entirety of a control interface 1006 is shown on the touch screen 1002. The control interface 1006 is shown in FIG. 10 to be partially transparent, as indicated by the dashed outer boundary thereof. The state depicted in FIG. 10 is similar to the state depicted in FIG. 8, except that the virtual element 1004 and the control interface 1006 in FIG. 10 partially overlap.

Figure 11:
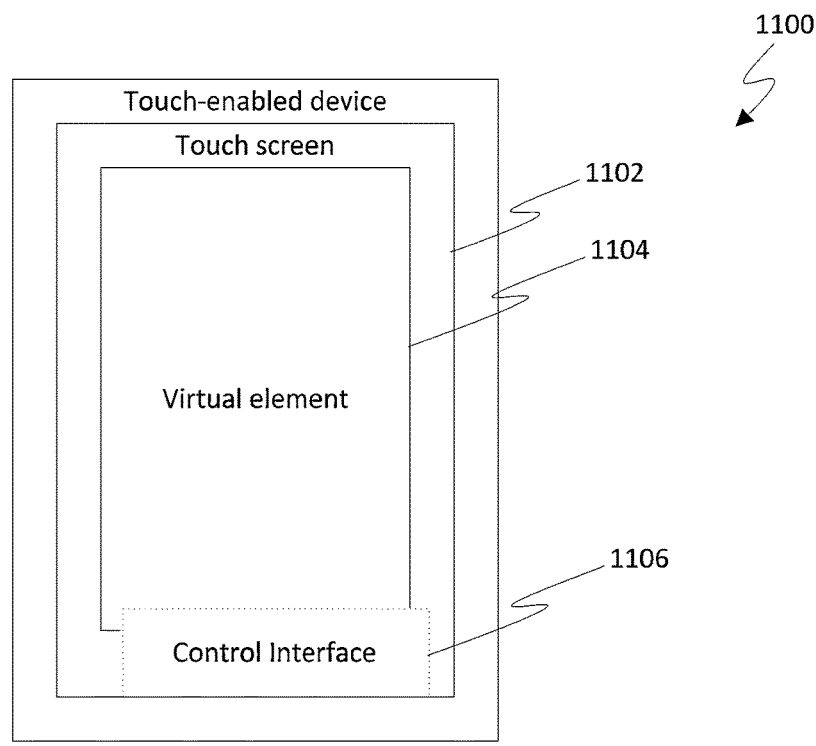

FIG. 11 depicts a state of a touch-enabled device 1100 in which a touch screen 1102 of the touch-enabled device 1100 displays a virtual element 1104. A control interface 1106 is partially shown on the touch screen 1102. The control interface 1106 is shown in FIG. 11 to be partially transparent, as indicated by the dashed outer boundary thereof. The state depicted in FIG. 11 is similar to the state depicted in FIG. 9, except that the virtual element 1104 and the control interface 1106 in FIG. 11 partially overlap.

Figure 12:
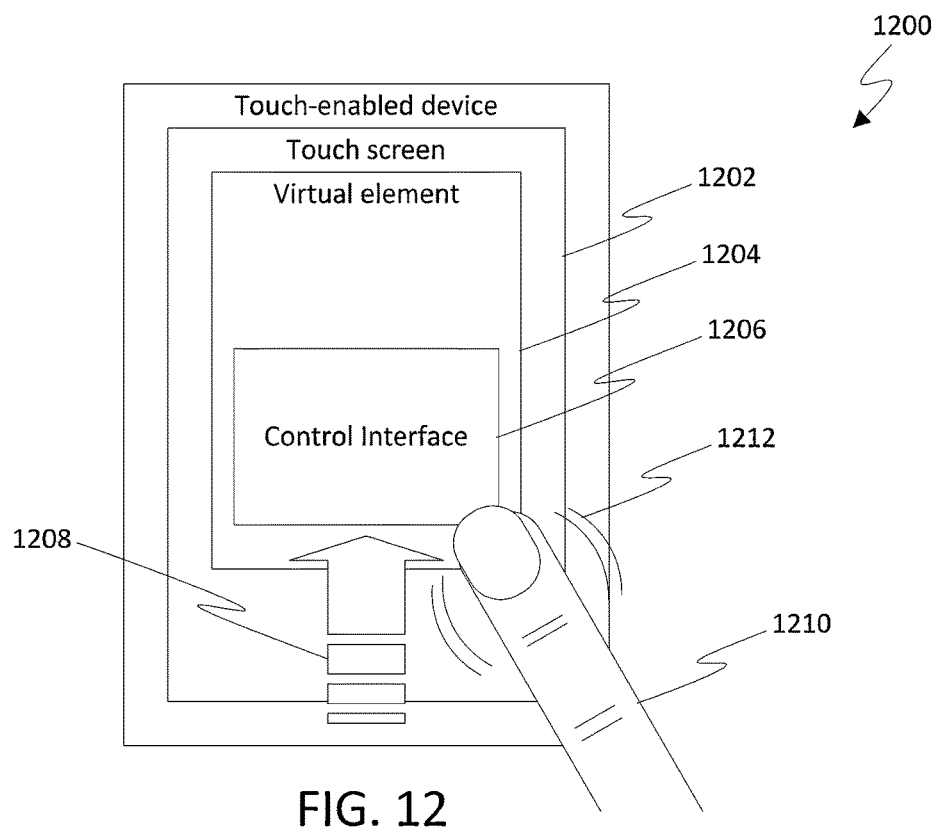

FIG. 12 depicts a state of a touch-enabled device 1200 in which a touch screen 1202 of the touch-enabled device 1200 displays a virtual element 1204. A control interface 1206 is caused to be presented on the touch screen 1202 based on a motion of finger(s) 1210, as depicted by motion indication lines 1212. The control interface 1206 is shown to move entirely into view on the touch screen, as depicted by arrow 1208.

The control interface 1206 is shown to move entirely into view from the bottom of the touch screen for illustrative purposes and is not intended to be limiting. It will be recognized that the control interface 1206 may be moved entirely into view from any side of the touch screen 1202 and/or any angle in a plane that defines the touch screen

1202. It will further be recognized that the control interface 1206 need not necessarily move into view. For example, the control interface 1206 may appear in its entirety on the touch screen 1202 without contacting an outer boundary of the touch screen 1202 (e.g., from a state in which the control interface 1206 is not shown or a state in which the control interface 1206 is partially shown and/or partially transparent). In accordance with this example, the control interface 1206 may fade into view on the touch screen 1202.

Figure 13:
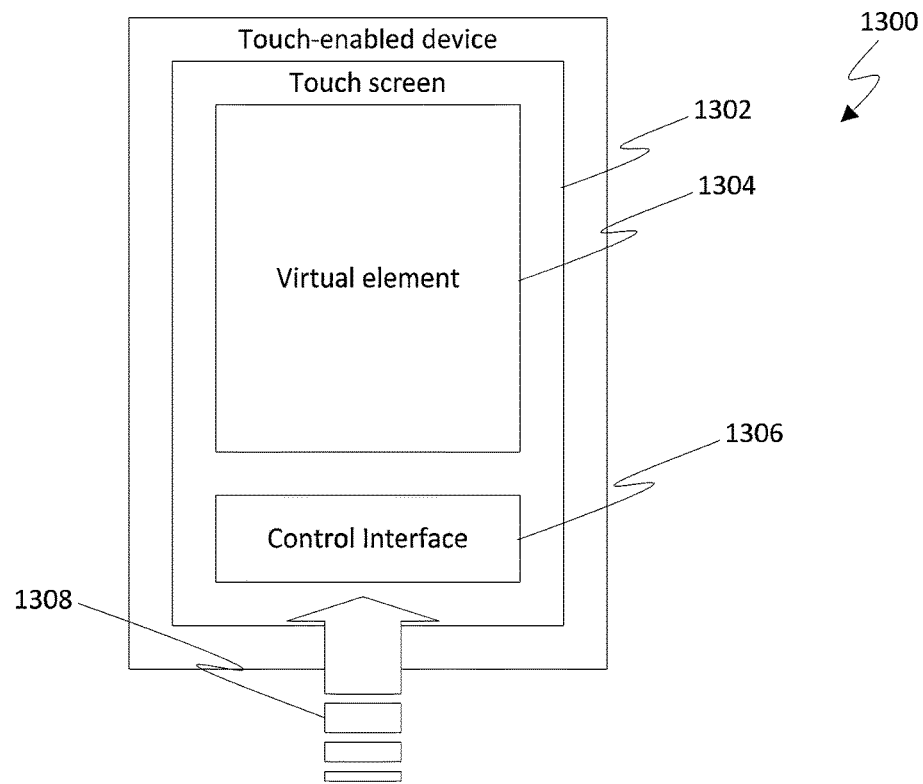
Figure 14:
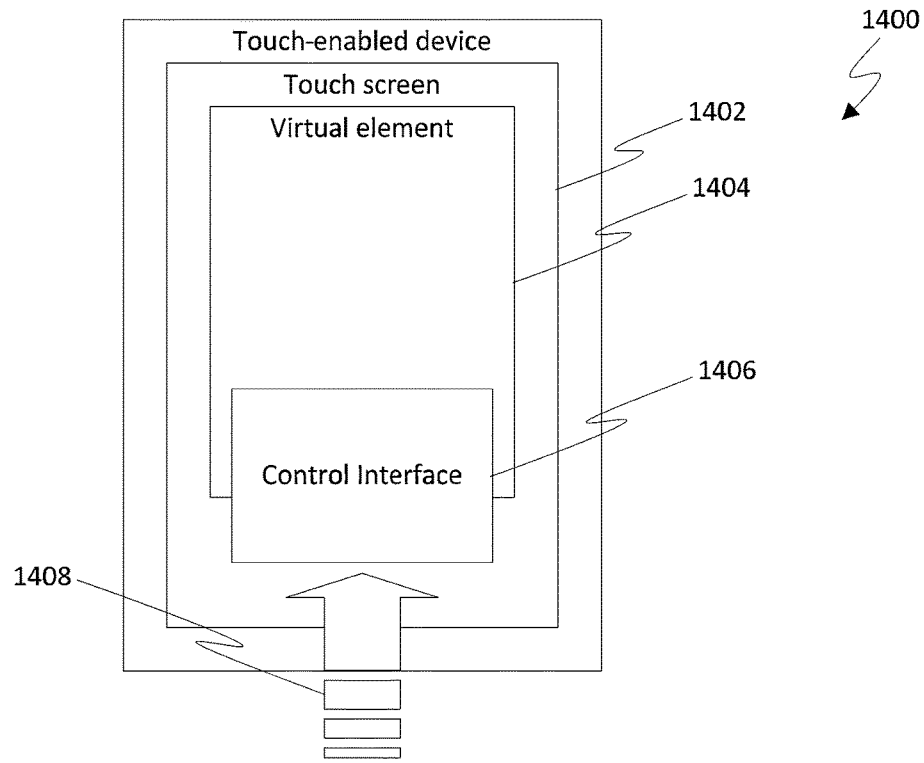

The control interface 1206 fully overlaps with the virtual element 1204, such that the outer boundary of the control interface 1206 is included within the outer boundary of the virtual element 1204, though the scope of the example embodiments is not limited in this respect (as will be seen in FIGS. 13 and 14).

FIG. 13 depicts a state of a touch-enabled device 1300 in which a touch screen 1302 of the touch-enabled device 1300 displays a virtual element 1304. A control interface 1306 is caused to be presented on the touch screen 1302, as depicted by arrow 1308. An entirety of the control interface 1306 is shown on the touch screen 1302. The state depicted in FIG. 13 is similar to the state depicted in FIG. 12, except that the virtual element 1304 and the control interface 1306 in FIG. 13 do not overlap.

FIG. 14 depicts a state of a touch-enabled device 1400 in which a touch screen 1402 of the touch-enabled device 1400 displays a virtual element 1404. A control interface 1406 is caused to be presented on the touch screen 1402, as depicted by arrow 1408. An entirety of the control interface 1406 is shown on the touch screen 1402. The state depicted in FIG. 14 is similar to the state depicted in FIG. 12, except that the virtual element 1404 and the control interface 1406 in FIG. 14 partially overlap.

Figure 15:
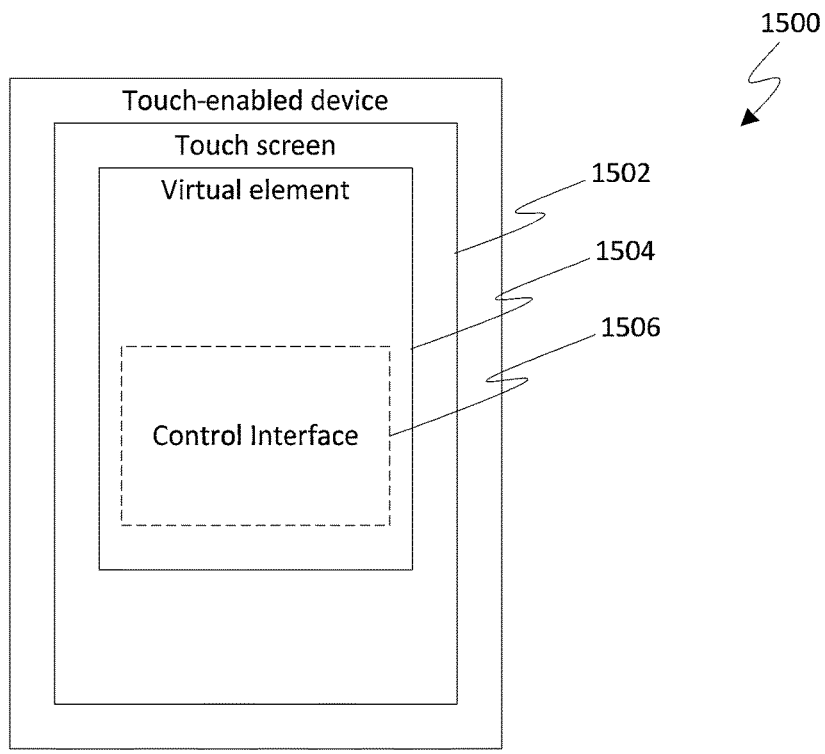

FIG. 15 depicts a state of a touch-enabled device 1500 in which a touch screen 1502 of the touch-enabled device 1500 displays a virtual element 1504. A control interface 1506 is caused to be presented on the touch screen 1502 based on a motion. An entirety of the control interface 1506 is shown on the touch screen 1502. The state depicted in FIG. 15 is similar to the state depicted in FIG. 12, except that the control interface 1506 in FIG. 15 is partially transparent, as indicated by the dashed outer boundary thereof. The state depicted in FIG. 15 is similar to the state depicted in FIG. 7, except that an extent of transparency of the control interface 706 shown in FIG. 7 is greater than an extent of transparency of the control interface 1506 shown in FIG. 15. Accordingly, an extent of opacity of the control interface 706 shown in FIG. 7 is less than an extent of opacity of the control interface 1506 shown in FIG. 15.

Figure 16:
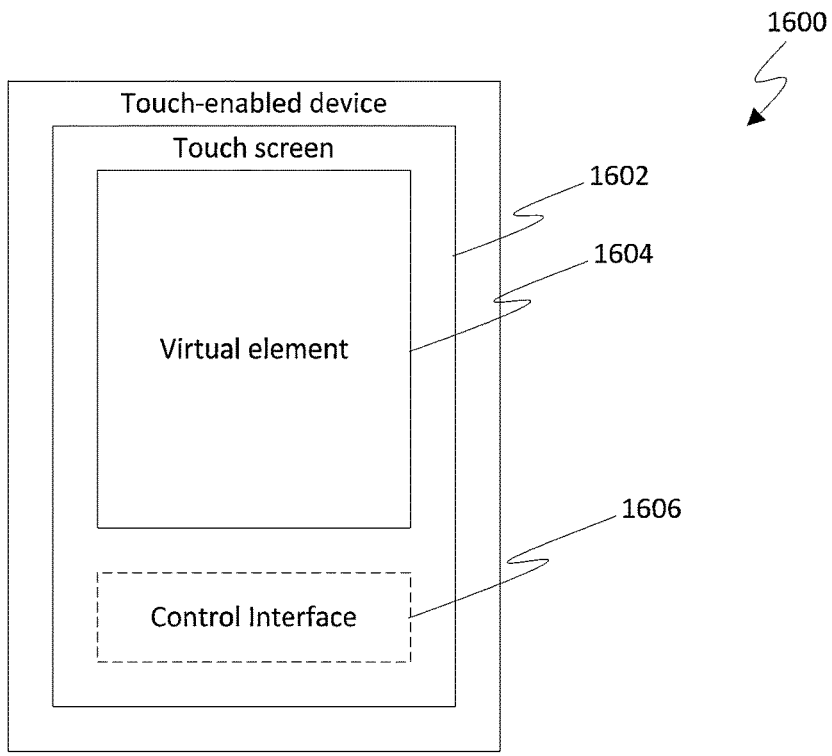

FIG. 16 depicts a state of a touch-enabled device 1600 in which a touch screen 1602 of the touch-enabled device 1600 displays a virtual element 1604. A control interface 1606 is caused to be presented on the touch screen 1602 based on a motion. An entirety of the control interface 1606 is shown on the touch screen 1602. The state depicted in FIG. 16 is similar to the state depicted in FIG. 13, except that the control interface 1606 in FIG. 16 is partially transparent, as indicated by the dashed outer boundary thereof. The state depicted in FIG. 16 is similar to the state depicted in FIG. 8, except that an extent of transparency of the control interface 806 shown in FIG. 8 is greater than an extent of transparency of the control interface 1606 shown in FIG. 16. Accordingly, an extent of opacity of the control interface 806 shown in FIG. 8 is less than an extent of opacity of the control interface 1606 shown in FIG. 16.

Figure 17:
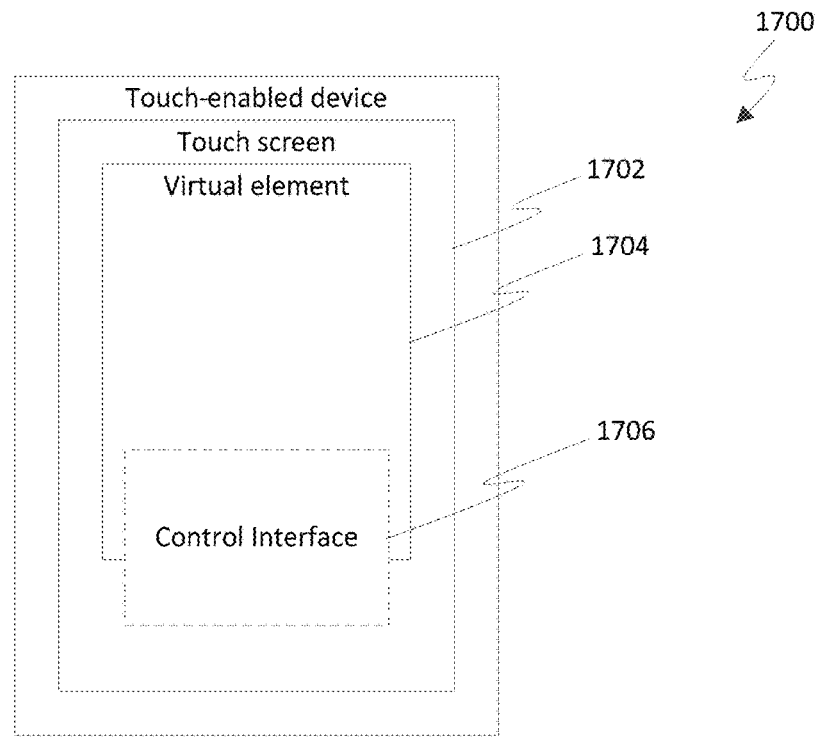

FIG. 17 depicts a state of a touch-enabled device 1700 in which a touch screen 1702 of the touch-enabled device 1700 displays a virtual element 1704. A control interface 1706 is caused to be presented on the touch screen 1702 based on a motion. An entirety of the control interface 1706 is shown on the touch screen 1702. The state depicted in FIG. 17 is similar to the state depicted in FIG. 14, except that the control interface 1706 in FIG. 17 is partially transparent, as indicated by the dashed outer boundary thereof. The state depicted in FIG. 17 is similar to the state depicted in FIG. 10, except that an extent of transparency of the control interface 1006 shown in FIG. 10 is greater than an extent of transparency of the control interface 1706 shown in FIG. 17. Accordingly, an extent of opacity of the control interface 1006 shown in FIG. 10 is less than an extent of opacity of the control interface 1706 shown in FIG. 17.

The example states depicted in FIGS. 4-17 are provided for illustrative purposes and are not intended to be limiting. It will be recognized that any suitable states (including states other than those described herein) may be used in the example techniques described herein for causing a control interface to be presented on a touch-enabled device.

Figure 18:
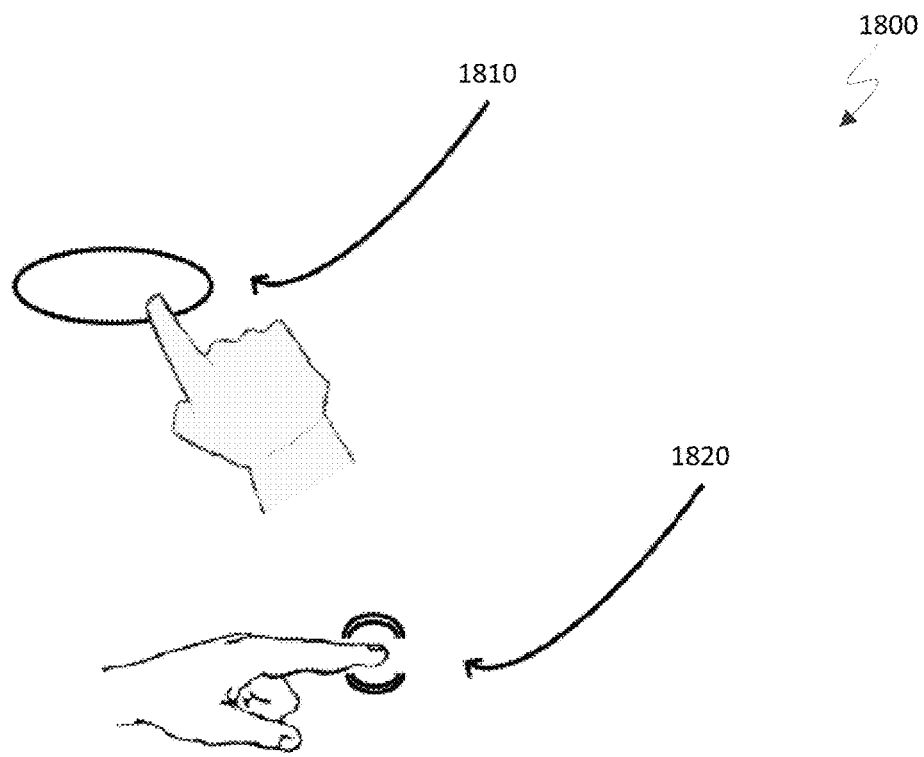
FIG. 18 shows examples of some hover input gestures that can be used for causing a control interface to be presented on a touch-enabled device.

FIG. 18 shows examples of some hover input gestures that can be used for causing a control interface to be presented on a touch-enabled device. A first hover gesture 1810 is a circle gesture wherein a user's finger moves in a circular motion. Clockwise circle gestures can be interpreted differently from counterclockwise circle gestures. For example, a counterclockwise circular gesture can be interpreted as causing an action that is opposite an action that is caused by a clockwise circular gesture (e.g., zoom in and zoom out, presentation of a control interface and discontinuation of the presentation, etc.). A second hover gesture 1820 is shown as a tickle motion wherein a user's fingertip moves in a back-and-forth motion. Although not shown in FIG. 18, a third hover gesture is where a user's pointer finger is maintained in the same hover position for more than a predetermined period of time. Other hover gestures can be used, such as a user tracing out a check mark over a touch screen of the touch-enabled device, for example. In any event, various hover gestures can be detected based on predefined finger motions at a spaced distance from the touch screen. Other hover gestures can be a quick move in and out without touching the screen. Thus, a user's finger enters and exits a hover zone within a predetermined time period. Another hover gesture can be a high-velocity flick, which involves a finger traveling at a certain minimal velocity over a distance. Still another hover gesture is a palm-based wave gesture. These and other hover gestures may constitute a motion that causes a control interface to be presented in accordance with example embodiments described herein.

Figure 19:
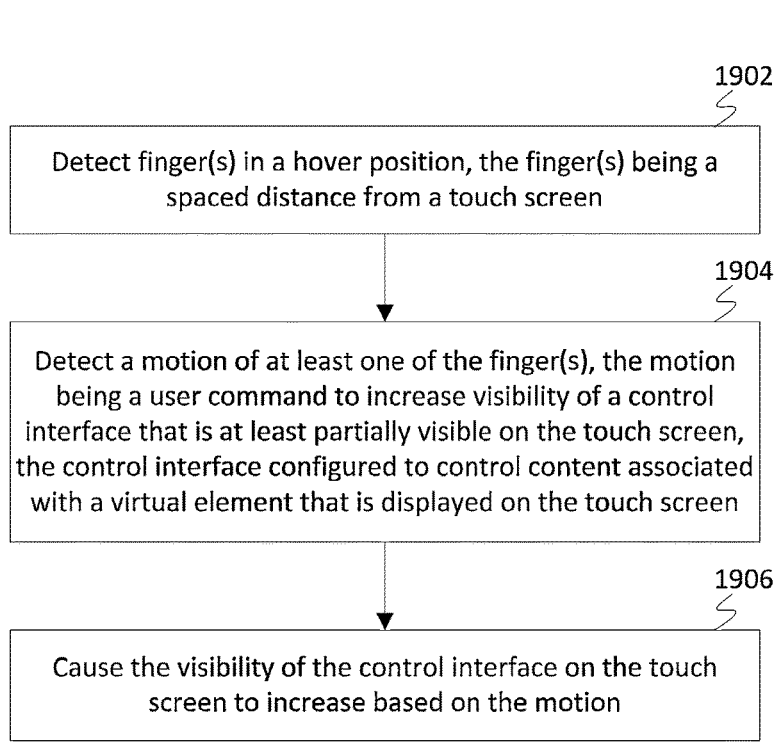
FIG. 19 depicts a flowchart of an example method for causing visibility of a control interface to be increased in accordance with an embodiment.
Figure 20:
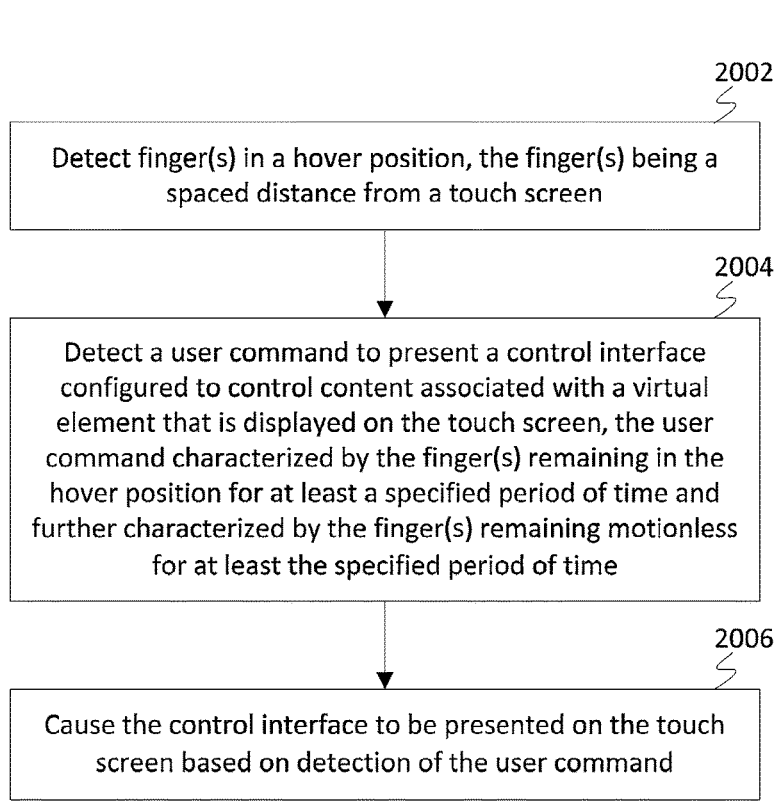
FIG. 20 depicts a flowchart of an example method for causing a control interface to be presented in accordance with an embodiment.

FIG. 19 depicts a flowchart 1900 of an example method for causing visibility of a control interface to be increased in accordance with an embodiment. FIG. 20 depicts a flowchart 2000 of an example method for causing a control interface to be presented in accordance with an embodiment. Flowcharts 1900 and 2000 may be performed by a mobile device, such as mobile device 100 shown in FIG. 1. It will be recognized that such a mobile device may include any one or more of the system components shown in FIG. 2. For instance, the mobile device may include touch screen sensor 210, gesture engine 212, operating system 214, and/or rendering engine 216. For illustrative purposes, flowcharts 1900 and 2000 are described with respect to the system components shown in FIG. 2. Further structural and operational embodiments will be apparent to persons skilled in the relevant art(s) based on the discussion regarding flowcharts 1900 and 2000.

As shown in FIG. 19, the method of flowchart 1900 begins at step 1902. In step 1902, finger(s) are detected in a hover position. The finger(s) are a spaced distance from a touch screen. In an example implementation, touch screen sensor 210 detects the finger(s) in the hover position. In accordance with this implementation, the finger(s) are a spaced distance from touch screen 132. For instance, the finger(s) may be a spaced distance from touch screen sensor 210 on touch screen 132.

At step 1904, motion of at least one of the finger(s) is detected. The motion is a user command to increase visibility of a control interface that is at least partially visible on the touch screen. The motion occurs without the at least one of the finger(s) touching the touch screen. The control interface is configured to control content associated with a virtual element that is displayed on the touch screen. In an example implementation, gesture engine 212 detects the motion of at least one of the finger(s).

In an example embodiment, step 1904 includes detecting that the motion occurs for at least a specified period of time. In another example embodiment, the motion includes a hover gesture (e.g., a finger hover flick, a high-velocity flick, a finger hover pan, a finger hover circle, fingers moving together, fingers moving apart, waving or swiping a hand that includes the at least one of the finger(s), etc.).

At step 1906, the visibility of the control interface on the touch screen is caused to be increased based on the motion. In an example implementation, operating system 214 and/or rendering engine 216 cause the visibility of the control interface on touch screen 132 to be increased based on the motion.

Causing the visibility of the control interface to be increased at step 1906 may be performed in any of a variety of ways. In a first example embodiment, step 1906 includes causing the control interface to change from a first state in which a portion of the control interface is shown on the touch screen to a second state in which an extent of the control interface that is greater than the portion (e.g., an entirety of the control interface) is shown on the touch screen. The portion of the control interfaced is less than all of the control interface.

In a second example embodiment, step 1906 includes causing the control interface to change from a first state in which the control interface is partially transparent to a second state in which the control interface is opaque.

In a third example embodiment, step 1906 includes causing the control interface to change from a first state to a second state. In accordance with this embodiment, in the first state, the control interface is partially transparent to provide a first extent of transparency. In further accordance with this embodiment, in the second state, the control interface is partially transparent to provide a second extent of transparency that is less than the first extent.

In the embodiment of FIG. 19, the control interface is at least partially visible on the touch screen when the motion of the at least one of the finger(s) is detected at step 1904. Thus, step 1906 may include transitioning from a first state to a second state, wherein the first state may be any of the states depicted in FIGS. 5-11 and the second state may be any of the states depicted in FIGS. 12-17. It will be recognized, however, that in this embodiment the first state cannot be the state depicted in FIG. 4. The control interface is not shown on the touch screen in FIG. 4 and therefore is not at least partially visible on the touch screen.

In some example embodiments, one or more steps 1902, 1904, and/or 1906 of flowchart 1900 may not be performed.

Moreover, steps in addition to or in lieu of steps 1902, 1904, and/or 1906 may be performed.

As shown in FIG. 20, the method of flowchart 2000 begins at step 2002. In step 2002, finger(s) are detected in a hover position. The finger(s) are a spaced distance from a touch screen. In an example implementation, touch screen sensor 210 detects the finger(s) in the hover position. In accordance with this implementation, the finger(s) are a spaced distance from touch screen 132. For instance, the finger(s) may be a spaced distance from touch screen sensor 210 on touch screen 132.

At step 2004, a user command to present a control interface configured to control content associated with a virtual element that is displayed on the touch screen is detected. The user command is characterized by the finger(s) remaining in the hover position for at least a specified period of time. The user command is further characterized by the finger(s) remaining motionless for at least the specified period of time. In an example implementation, gesture engine 212 detects the user command. For instance, gesture engine 212 may detect that the finger(s) remain in the hover position for at least the specified period of time and that the finger(s) remain motionless for at least the specified period of time.

In an example embodiment, the user command is further characterized by occurrence of at least one non-hover gesture. A non-hover gesture is a gesture that does not include hovering. Examples of a non-hover gesture include but are not limited to a gaze gesture (e.g., gazing for at least a threshold period of time), a look-and-blink gesture (e.g., blinking while looking), a voice gesture (e.g., saying a command), etc. In an example implementation, gesture engine 212 detects the at least one non-hover gesture.

At step 2006, the control interface is caused to be presented on the touch screen based on detection of the user command. In an example implementation, operating system 214 and/or rendering engine 216 cause the control interface to be presented on touch screen 132 based on the detection of the user command.

Causing the control interface to be presented at step 2006 may be performed in any of a variety of ways. In a first example embodiment, step 2006 includes transitioning from a first state in which the control interface is not shown on the touch screen to a second state in which the control interface is shown on the touch screen.

In a second example embodiment, step 2006 includes causing the control interface to change from a first state in which a portion of the control interface is shown on the touch screen to a second state in which an extent of the control interface that is greater than the portion (e.g., an entirety of the control interface) is shown on the touch screen. The portion of the control interfaced is less than all of the control interface.

In a third example embodiment, step 2006 includes causing the control interface to change from a first state in which the control interface is partially transparent to a second state in which the control interface is opaque.

In a fourth example embodiment, step 2006 includes causing the control interface to change from a first state to a second state. In accordance with this embodiment, in the first state, the control interface is partially transparent to provide a first extent of transparency. In further accordance with this embodiment, in the second state, the control interface is partially transparent to provide a second extent of transparency that is less than the first extent.

In the embodiment of FIG. 20, step 2006 may include transitioning from a first state to a second state, wherein the first state may be any of the states depicted in FIGS. 4-11 and the second state may be any of the states depicted in FIGS. 12-17.

In some example embodiments, one or more steps 2002, 2004, and/or 2006 of flowchart 2000 may not be performed. Moreover, steps in addition to or in lieu of steps 2002, 2004, and/or 2006 may be performed.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any one or more of the components 102 shown in FIG. 1, rendering engine 216, gesture engine 212, flowchart 300, flowchart 1900, and/or flowchart 2000 may be implemented in hardware, software, firmware, or any combination thereof.

For example, any one or more of components 102, rendering engine 216, gesture engine 212, flowchart 300, flowchart 1900, and/or flowchart 2000 may be implemented as computer program code configured to be executed in one or more processors.

For clarity, only certain selected aspects of the software-based and firmware-based implementations are described. Other details that are well known in the art are omitted. For example, it should be understood that the disclosed technology is not limited to any specific computer language or program. For instance, the disclosed technology can be implemented by software and/or firmware written in C++, Java, Perl, JavaScript, Adobe Flash, or any other suitable programming language.

In another example, any one or more of components 102, rendering engine 216, gesture engine 212, flowchart 300, flowchart 1900, and/or flowchart 2000 may be implemented as hardware logic/electrical circuitry.

For instance, in an embodiment, one or more of components 102, rendering engine 216, operating system 214, gesture engine 212, touch screen sensor 210, flowchart 300, flowchart 1900, and/or flowchart 2000 may be implemented in a system-on-chip (SoC). The SoC may include an integrated circuit chip that includes one or more of a processor (e.g., a microcontroller, microprocessor, digital signal processor (DSP), etc.), memory, one or more communication interfaces, and/or further circuits and/or embedded firmware to perform its functions.

III. Example Computer System

Figure 21:
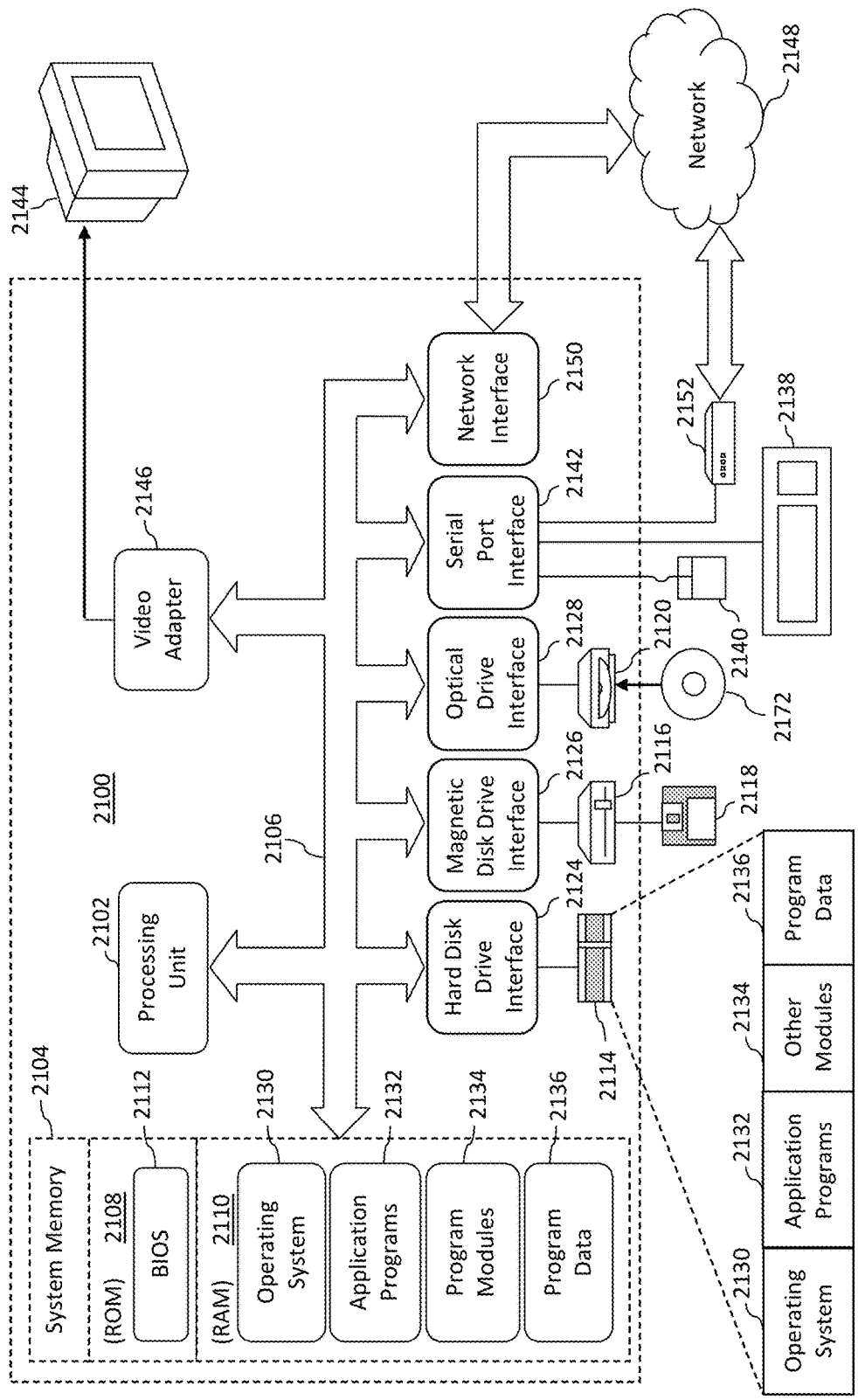
FIG. 21 depicts an example computer in which embodiments may be implemented.

FIG. 21 depicts an example computer 2100 in which embodiments may be implemented. For instance, mobile device 100 shown in FIG. 1 may be implemented using computer 2100, including one or more features of computer 2100 and/or alternative features. Computer 2100 may be a general-purpose computing device in the form of a conventional personal computer, a mobile computer, or a workstation, for example, or computer 2100 may be a special purpose computing device. The description of computer 2100 provided herein is provided for purposes of illustration, and is not intended to be limiting. Embodiments may be implemented in further types of computer systems, as would be known to persons skilled in the relevant art(s).

As shown in FIG. 21, computer 2100 includes a processing unit 2102, a system memory 2104, and a bus 2106 that couples various system components including system memory 2104 to processing unit 2102. Bus 2106 represents one or more of any of several types of bus structures, including a memory bus or memory controller, a peripheral bus, an accelerated graphics port, and a processor or local bus using any of a variety of bus architectures. System memory 2104 includes read only memory (ROM) 2108 and random access memory (RAM) 2110. A basic input/output system 2112 (BIOS) is stored in ROM 2108.

Computer 2100 also has one or more of the following drives: a hard disk drive 2114 for reading from and writing to a hard disk, a magnetic disk drive 2116 for reading from or writing to a removable magnetic disk 2118, and an optical disk drive 2120 for reading from or writing to a removable optical disk 2122 such as a CD ROM, DVD ROM, or other optical media. Hard disk drive 2114, magnetic disk drive 2116, and optical disk drive 2120 are connected to bus 2106 by a hard disk drive interface 2124, a magnetic disk drive interface 2126, and an optical drive interface 2128, respectively. The drives and their associated computer-readable storage media provide nonvolatile storage of computer-readable instructions, data structures, program modules and other data for the computer. Although a hard disk, a removable magnetic disk and a removable optical disk are described, other types of computer-readable storage media can be used to store data, such as flash memory cards, digital video disks, random access memories (RAMs), read only memories (ROM), and the like.

A number of program modules may be stored on the hard disk, magnetic disk, optical disk, ROM, or RAM. These programs include an operating system 2130, one or more application programs 2132, other program modules 2134, and program data 2136. Application programs 2132 or program modules 2134 may include, for example, computer program logic for implementing any one or more of components 102, rendering engine 216, gesture engine 212, flowchart 300 (including any step of flowchart 300), flowchart 1900 (including any step of flowchart 1900), and/or flowchart 2000 (including any step of flowchart 2000), as described herein.

A user may enter commands and information into the computer 2100 through input devices such as keyboard 2138 and pointing device 2140. Other input devices (not shown) may include a microphone, joystick, game pad, satellite dish, scanner, touch screen, camera, accelerometer, gyroscope, or the like. These and other input devices are often connected to the processing unit 2102 through a serial port interface 2142 that is coupled to bus 2106, but may be connected by other interfaces, such as a parallel port, game port, or a universal serial bus (USB).

A display device 2144 (e.g., a monitor) is also connected to bus 2106 via an interface, such as a video adapter 2146. In addition to display device 2144, computer 2100 may include other peripheral output devices (not shown) such as speakers and printers.

Computer 2100 is connected to a network 2148 (e.g., the Internet) through a network interface or adapter 2150, a modem 2152, or other means for establishing communications over the network. Modem 2152, which may be internal or external, is connected to bus 2106 via serial port interface 2142.

As used herein, the terms "computer program medium" and "computer-readable storage medium" are used to generally refer to media such as the hard disk associated with hard disk drive 2114, removable magnetic disk 2118, removable optical disk 2122, as well as other media such as flash memory cards, digital video disks, random access memories (RAMs), read only memories (ROM), and the like. Such computer-readable storage media are distinguished from and non-overlapping with communication media (do not include communication media). Communication media typically embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media. Example embodiments are also directed to such communication media.

As noted above, computer programs and modules (including application programs 2132 and other program modules 2134) may be stored on the hard disk, magnetic disk, optical disk, ROM, or RAM. Such computer programs may also be received via network interface 2150 or serial port interface 2142. Such computer programs, when executed or loaded by an application, enable computer 2100 to implement features of embodiments discussed herein. Accordingly, such computer programs represent controllers of the computer 2100.

Example embodiments are also directed to computer program products comprising software (e.g., computer-readable instructions) stored on any computer-useable medium. Such software, when executed in one or more data processing devices, causes a data processing device(s) to operate as described herein. Embodiments may employ any computer-useable or computer-readable medium, known now or in the future. Examples of computer-readable mediums include, but are not limited to storage devices such as RAM, hard drives, floppy disks, CD ROMs, DVD ROMs, zip disks, tapes, magnetic storage devices, optical storage devices, MEMS-based storage devices, nanotechnology-based storage devices, and the like.

It will be recognized that the disclosed technology is not limited to any particular computer or type of hardware. Certain details of suitable computers and hardware are well known and need not be set forth in detail in this disclosure.

IV. Conclusion

While various embodiments have been described above, it should be understood that they have been presented by way of example only, and not limitation. It will be apparent to persons skilled in the relevant art(s) that various changes in form and details can be made therein without departing from the spirit and scope of the invention. Thus, the breadth and scope of the present invention should not be limited by any of the above-described example embodiments, but should be defined only in accordance with the following claims and their equivalents.

What is claimed is:

1. A method comprising:
   detecting one or more fingers in a hover position, the one or more fingers being a spaced distance from a touch screen, the detecting the one or more fingers in the hover position causing a hover mode to be entered, the hover mode enabling detection of a motion of at least one of the one or more fingers;
   detecting the motion of the at least one of the one or more fingers in response to the detecting the one or more fingers in the hover position causing the hover mode to be entered, the motion being a user command to increase visibility of a control interface that is at least partially visible on the touch screen, the control interface configured to control content associated with a virtual element that is displayed on the touch screen, the motion occurring without the at least one of the one or more fingers touching the touch screen; and
   causing the visibility of the control interface on the touch screen to increase, at least by decreasing transparency of the control interface from a first transparency that is less than one-hundred percent to a second transparency that is less than the first transparency, based at least in part on the motion.

2. The method of claim 1, wherein detecting the motion comprises:
   detecting that the motion occurs for at least a specified period of time.

3. The method of claim 1, wherein the at least one of the one or more fingers includes a plurality of fingers; and
   wherein detecting the motion comprises:
   detecting that the plurality of fingers are moved together, or
   detecting that the plurality of fingers are moved apart.

4. The method of claim 1, wherein the transitioning is periodic and includes one or more discrete intermediate states between the first state and the second state;
   wherein each successive intermediate state is characterized by an incrementally greater visibility of the control interface; and
   wherein the second state is characterized by a visibility of the control interface that is greater than a visibility of the control interface that characterizes each of the one or more discrete intermediate states.

5. The method of claim 1, wherein the virtual element is a representation of a song or a video; and
   wherein the motion is the user command to present the control interface that enables a user to control the song or the video.

6. The method of claim 1, wherein the virtual element is a representation of a message; and
   wherein the motion is the user command to present the control interface that enables a user to perform an operation with respect to the message.

7. The method of claim 1, wherein causing the visibility of the control interface on the touch screen to increase comprises:
   causing the control interface to change from a first state in which the control interface is partially transparent to a second state in which the control interface is opaque.

8. The method of claim 1, wherein causing the visibility of the control interface on the touch screen to increase comprises:
   causing the control interface to change from a first state to a second state;
   wherein, in the first state, the control interface is partially transparent to provide a first extent of transparency; and
   wherein, in the second state, the control interface is partially transparent to provide a second extent of transparency that is less than the first extent.

9. A system comprising:
   a touch screen sensor configured to detect one or more fingers in a hover position, the one or more fingers being a spaced distance from a touch screen, detection of the one or more fingers in the hover position causing a hover mode to be entered, the hover mode enabling detection of a motion of at least one of the one or more fingers;
   a gesture engine configured to detect the motion of the at least one of the one or more fingers that occurs without the at least one of the one or more fingers touching the touch screen in response to detection of the one or more fingers in the hover position causing the hover mode to be entered, the motion being a user command to increase visibility of a control interface that is at least partially visible on the touch screen, the control interface configured to control content associated with a virtual element that is displayed on the touch screen; and a rendering engine configured to cause the visibility of the control interface on the touch screen to increase, at least by decreasing transparency of the control interface from a first transparency that is less than one-hundred percent to a second transparency that is less than the first transparency, based at least in part on the motion.

10. The system of claim 9, wherein the rendering engine is configured to cause the control interface to change from a first state in which the control interface is partially transparent to a second state in which the control interface is opaque.

11. The system of claim 9, wherein the rendering engine is configured to cause the control interface to change from a first state to a second state;
   wherein, in the first state, the control interface is partially transparent to provide a first extent of transparency; and
   wherein, in the second state, the control interface is partially transparent to provide a second extent of transparency that is less than the first extent.

12. The system of claim 9, wherein the rendering engine is configured to cause the control interface to change from a first state in which a portion of the control interface is shown on the touch screen to a second state in which an entirety of the control interface is shown on the touch screen, the portion being less than all of the control interface.

13. The system of claim 9, wherein the gesture engine is configured to detect a finger hover flick performed by the at least one of the one or more fingers.

14. The system of claim 9, wherein the gesture engine is configured to detect a high-velocity flick performed by the at least one of the one or more fingers, the high-velocity flick defined by the at least one of the one or more fingers traveling at a velocity that is greater than or equal to a threshold velocity.

15. The system of claim 9, wherein the gesture engine is configured to detect a finger hover circle performed by the at least one of the one or more fingers.

16. A computer program product comprising a computer-readable storage medium having computer program logic recorded thereon for enabling a processor-based system to cause a control interface to be presented on a touch screen, the computer program product comprising:
   a first program logic module for enabling the processor-based system to detect one or more fingers in a hover position, the one or more fingers being a spaced distance from the touch screen;
   a second program logic module for enabling the processor-based system to detect a user command to present the control interface configured to control content associated with a virtual element that is displayed on the touch screen, the user command characterized by the one or more fingers remaining in the hover position for at least a specified period of time and further characterized by the one or more fingers remaining motionless for at least the specified period of time; and
   a third program logic module for enabling the processor-based system to cause the control interface to be presented on the touch screen based at least in part on detection of the user command.

17. The computer program product of claim 16, wherein the third program logic module comprises:
   logic for enabling the processor-based system to cause a transition from a first state in which the control interface is not shown on the touch screen to a second state in which the control interface is shown on the touch screen.

18. The computer program product of claim 16, wherein the third program logic module comprises:
   logic for enabling the processor-based system to cause the control interface to change from a first state in which the control interface is partially transparent to a second state in which the control interface is opaque.

19. The computer program product of claim 16, wherein the third program logic module comprises:
   logic for enabling the processor-based system to cause the control interface to change from a first state to a second state;
   wherein, in the first state, the control interface is partially transparent to provide a first extent of transparency; and
   wherein, in the second state, the control interface is partially transparent to provide a second extent of transparency that is less than the first extent.

20. The computer program product of claim 16, wherein the third program logic module comprises:
   logic for enabling the processor-based system to cause the control interface to change from a first state in which a portion of the control interface is shown on the touch screen to a second state in which an entirety of the control interface is shown on the touch screen, the portion being less than all of the control interface.

* * * * *